United States Patent [19]

Nagayoshi et al.

[11] Patent Number: 5,046,903
[45] Date of Patent: Sep. 10, 1991

[54] METHOD AND APPARATUS FOR CONDUCTING OPERATION IN PIPE

[75] Inventors: Akito Nagayoshi, Matsudo; Katsuhide Isaka, Yachiyo; Masahiro Ito, Yokosuka, all of Japan

[73] Assignees: Kabushiki Kaisha Iseki Kaihatsu Koki, Tokyo; Sekisui Kagaku Kogyo Kabushiki Kaisha, Osaka, both of Japan

[21] Appl. No.: 303,561

[22] Filed: Jan. 27, 1989

[30] Foreign Application Priority Data

Jan. 27, 1988 [JP] Japan ................................. 63-14678
Nov. 14, 1988 [JP] Japan ............................... 63-285789
Nov. 15, 1988 [JP] Japan ............................... 63-286622

[51] Int. Cl.⁵ .......................... B23C 3/00; E03F 3/06
[52] U.S. Cl. .................... 409/143; 408/130; 408/79; 166/55; 409/185; 409/190; 92/146
[58] Field of Search ............. 409/132, 179, 143, 190, 409/185, 194; 166/50, 55–55.8; 175/77, 78; 83/185, 186; 29/33 T; 408/130, 79; 92/61, 146

[56] References Cited

U.S. PATENT DOCUMENTS 1,358,818 11/1920 Bering ............................ 166/55.7
3,485,323 12/1969 Vlinshi ................................ 92/61
4,175,471 11/1979 Wilger et al. .................... 409/143 X
4,197,908 4/1980 Davis et al. ..................... 409/143 X
4,222,687 9/1980 Williams ........................... 408/88 X
4,442,891 4/1984 Wood .............................. 409/143 X
4,577,388 3/1986 Wood .............................. 409/132 X
4,630,676 12/1986 Long, Jr. ......................... 409/143 X
4,648,454 3/1987 Yarnell ........................... 166/55.7 X
4,657,450 4/1987 Forner et al. ...................... 409/143
4,701,988 10/1987 Wood .............................. 409/143 X
4,785,512 11/1988 Sigel ..................................... 29/33
4,819,721 4/1989 Long, Jr. ........................ 409/190 X

FOREIGN PATENT DOCUMENTS 179724 8/1986 Japan .

Primary Examiner—Larry I. Schwartz
Assistant Examiner—R. Schultz
Attorney, Agent, or Firm—Ware, Fressola, Van Dery Sluys & Adolphson

[57] ABSTRACT

A method and an apparatus for conducting predetermined operations in the interior of a pipe with a cutter, in which the cutter is shifted so that a rotary axis of the cutter is angularly displaced about an axis extending along the pipe and is displaced in the axial direction of the pipe while the cutter is rotated about an axis extending in the axial direction of the pipe or about an axis extending in the radial direction of the pipe.

16 Claims, 20 Drawing Sheets

METHOD AND APPARATUS FOR CONDUCTING OPERATION IN PIPE

BACKGROUND OF THE INVENTION

1. Field of the Invention

This invention relates to a method and an apparatus for conducting operations such as cutting an existing pipe for boring, removal of substance deposited on the inner surface of the pipe or protrusions extending into the pipe, and disposition of a plug of cutoff in a pipe opening of a branch pipe and, more particularly, to a method and an apparatus for conducting operations in a pipe suitable for fitting a plug of cutoff in a branch pipe communicating to a main pipe comprising the existing pipe and a newly installed pipe to thereby close an opening of the branch pipe on the main pipe side, cutting away protrusions of the branch pipe such as to remove the protrusions thereof extending into the main pipe and cutting away a portion of the newly installed pipe so as to bore a hole in the newly installed pipe from the interior thereof to thereby afford communication between the main pipe and the branch pipe.

2. Description of the Prior Art

Various methods for disposing new pipes in existing pipes, and for applying coating or lining to the inner surface of an existing pipe have been proposed and executed in order to reproduce, i.e., renew the existing pipes such as sewer pipes, water-supply pipes, gas pipes, pipes for power lines and pipes for telephone lines. According to these renewing methods, newly installed pipes are positioned in the interior of the existing pipe so as to be substantially integral therewith.

When the existing pipe being renewed in accordance with the above methods has protrusions therein as in the case of a sewer pipe having a portion of a mounting pipe, i.e., a branch pipe protruding into a main pipe the existing pipe requires removing the protrusions therein before pipes to be newly installed are disposed in the existing pipe. However, since the inner surface of the existing pipe is usually circular in shape, it is difficult to correctly cut away the protrusions.

Also, since a pipe opening of the branch pipe is closed by the newly installed pipe when the pipe is renewed according to the above renewing method, it is necessary to bore a hole in the newly installed pipe to thereby open the pipe opening of the branch pipe into the newly installed pipe. In this case, if the axis of the branch pipe is not orthogonal to the axis of the newly installed pipe, the hole corresponding to the pipe opening of the branch pipe cannot be accurately bored only by rotating a cutter around the axis extending in the radial direction of the newly installed pipe.

SUMMARY OF THE INVENTION

It is an object of the present invention to provide a method and an apparatus for conducting operations in a pipe, in which protrusions or pipes can be accurately cut away and in which a plug of cutoff can be fitted into a second pipe.

A method for conducting predetermined operations in the interior of a pipe with working means according to the present invention comprises the step of shifting the working means so that a rotary axis of the working means is angularly displaced around an axis extending along the pipe and is displaced in the axial direction of the pipe, while angularly displacing the working means about the axis extending in the axial direction of the pipe or around an axis extending in the radial direction of the pipe.

An apparatus for conducting predetermined operations in the interior of a pipe with working means according to the present invention comprises support means disposed in the pipe so as to be movable in the axial direction of the pipe, and drive means supported by the support means and shifting the working means such that a rotary axis of the working means is angularly displaced around an axis extending along the pipe and is displaced in the axial direction of the pipe while rotating the working means around the axis extending in the axial direction of the pipe or around an axis extending in the radial direction of the pipe.

The working means such as a cutter is shifted such that the rotary axis thereof is angularly displaced around the axis extending along the pipe and is displaced in the axial direction of the pipe. Thus, use may be made of working means which draws a locus of rotation having a diameter smaller than that of portions to be worked.

When the angular displacement, i.e., chord size in the locus of reciprocation in the circumferential direction of the first pipe, of the rotary axis of the working means is identical with the displacement parallel to the axis of the pipe, the locus of motion of the working means comes to a circle. On the other hand, when the angular displacement is larger than the axial displacement, the locus of motion of the working means comes to a long ellipse having a major or longer axis extending in the circumferential direction of the pipe. Further, when the angular displacement is smaller than the axial displacement, the locus of motion of the working means comes to an ellipse having a longer axis extending in the axial direction of the pipe.

By adjusting the timing in which the angular displacement results in a maximum value and the timing in which the axial displacement results in a maximum value, it is possible to set the direction of the longer axis of the ellipse. Also, by adjusting the relative values of the angular displacement and axial displacement, a desired ellipse in shape and size may be obtained.

According to the present invention, the rotary axis of the working means is angularly displaced around the axis extending along the pipe and is displaced in the axial direction of the pipe. Therefore, when protrusions are cut away, it is possible to securely cut away the protrusions up to the proximity of the inner surface of the pipe. Further, when a portion of the pipe is cut away to bore a hole, it is possible to bore a hole corresponding in shape to the hole to be bored. Further, when a plug of cutoff is disposed in a pipe opening of a second pipe communicating to a first pipe, the plug of cutoff can be securely fitted in the pipe opening of the second pipe.

In a preferred embodiment, the drive means for rotating the working means and displacing the rotary axis of the working means comprises a drive mechanism for shifting the working means so that the rotary axis of the working means is displaced in the axial direction of the pipe and is angularly displaced around the axis extending along the pipe and another drive mechanism for rotating the working means around its own rotary axis.

In another preferred embodiment, the drive means comprises a first drive mechanism for shifting the working means so that the rotary axis of the working means is displaced in the axial direction of the pipe, a second drive mechanism for shifting the working means so that the rotary axis of the working means is angularly displaced around the axis extending along the pipe and a third drive mechanism for rotating the working means around its own rotary axis.

It is preferable that the drive means further comprises a fourth drive mechanism for shifting the working means in the radial direction of the pipe while rotating the working means and displacing the rotary axis thereof.

In a preferred embodiment, the drive means is driven by high pressure operating fluid such as operating oil.

An apparatus for conducting operations in a pipe by using the operating fluid comprises support means disposed in a pipe so as to be movable in the axial direction of the pipe, fluid guide means for guiding the operating fluid and provided with a rod extending in the axial direction of the pipe and a tubular receiving member defining a space for receiving the rod, the fluid guide means being supported by the support means so that the rod is movable in the axial direction of the pipe, first drive means for rotating the rod around the axis thereof relative to the tubular receiving member while shifting the rod in the axial direction thereof, and second drive means operated by the operation of the operating fluid passing through the fluid guide means to rotate the working means around its own rotary axis, wherein the tubular receiving member is provided with a plurality of flow paths for use of the operating fluid and the rod has a plurality of recesses correspondingly communicating to the flow paths, extending circumferentially on the outer periphery of the rod while being spaced apart from each other in the axial direction of the pipe and a plurality of holes correspondingly communicating to the recesses and extending in the axial direction of the pipe.

Since the operating fluid for use in the second drive means passes through the fluid guide means, the apparatus as noted above does not require any hose which hinders the angular rotation and reciprocation of the working means and is displaced relative to the second drive means, even though the second drive means is capable of shifting in the axial direction of the pipe, and besides, capable of rotating around the axis of the pipe. As a result, the angular rotation and reciprocation of the working means may be smoothened.

Another apparatus for conducting operations in a pipe by using the operating fluid comprises support means disposed in a pipe so as to be movable in the axial direction of the pipe and defining a plurality of flow paths expansible or contractible in the axial direction of the pipe for the operating fluid, fluid guide means for guiding the operating fluid and provided with a rod extending in the axial direction of the pipe and a tubular receiving member defining a chamber for receiving the rod so as to be rotatable about an axis of the rod, the fluid guide means being supported by the support means so that the rod is movable in the axial direction of the pipe, first drive means for shifting the fluid guide means in the axial direction of the pipe, second drive means for angularly rotating the rod relative to the tubular receiving member and third drive means operated by the operation of the operating fluid passing through the support means and fluid guide means to rotate the working means about its own rotary axis, wherein the support means is provided with a first member having a plurality of chambers extending in the axial direction of the pipe and a plurality of tubular second members correspondingly received in the chamber of the first member so as to be movable in the direction of the chamber and defining the flow path in cooperation with the first member, the tubular receiving member is provided with a plurality of operating fluid flow paths correspondingly communicating to the flow paths of the support means and the rod has a plurality of recesses correspondingly communicating to the operating fluid flow paths of the tubular receiving member and extending in the circumferential direction on the outer periphery of the rod while being spaced apart from each other in the axial direction of the pipe and a plurality of fluid flow holes correspondingly communicating to the recesses and extending in the axial direction of the pipe.

In such an apparatus as noted above, since the operating fluid for use in the third drive means passes through the expansible or contractible flow path provided in the support means and the fluid guide means, this apparatus does not require any hose which hinders the angular rotation and reciprocation of the working means and is displaced relative to the third drive means, even though the third drive means is capable of shifting in the axial direction of the pipe, and besides, capable of rotating about the axis of the rod. Thus, the angular rotation and reciprocation of the working means is smoothened. Further, since the second member of the support means is received in the chamber of the first member thereof so as to be movable in the axial direction of the first member, the size of the flow path in the support means in maximum length may be enlarged even if the size of the whole apparatus in length in the direction of the pipe is shortened.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF PREFERRED EMBODIMENTS

Figure 1:
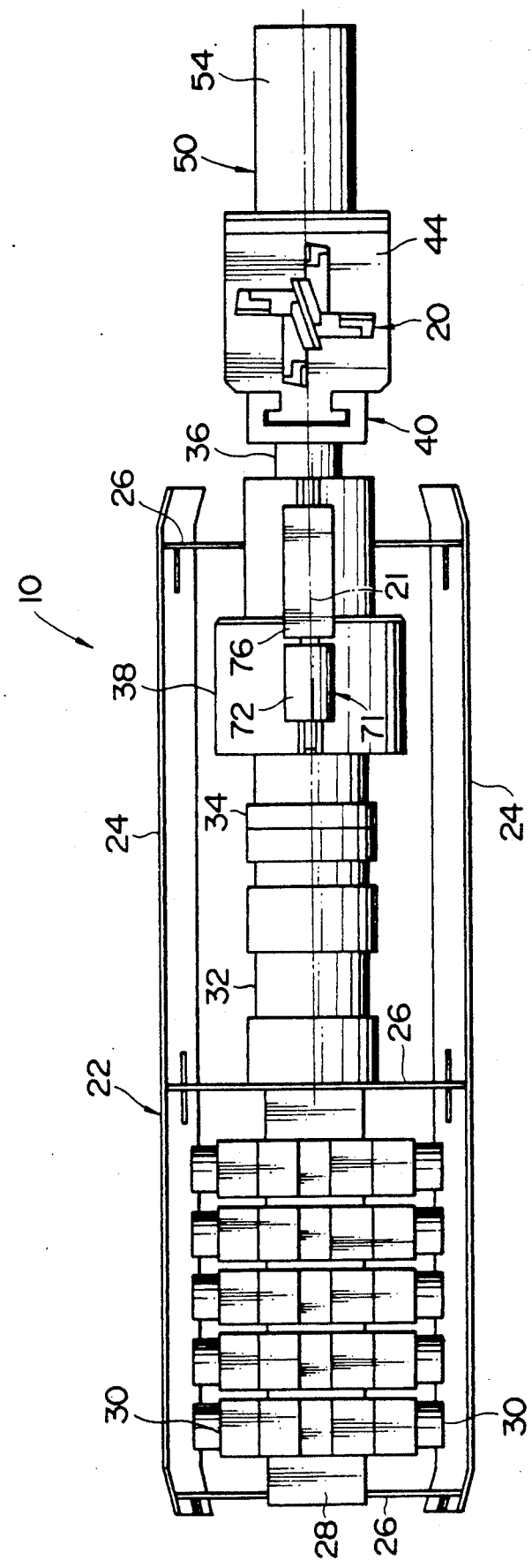
FIG. 1 is a plan view showing an embodiment of an apparatus for conducting operations in a pipe according to the present invention.

Referring to FIGS. 1 through 4, an apparatus 10 for conducting operations in a pipe 12 is shown.

The apparatus 10 is movably disposed in a first pipe 12 embedded in the ground. The first pipe 12 in the illustrated embodiment consists of an existing pipe 14 and a newly installed pipe 16 made of synthetic resin and disposed inside the existing pipe. The existing pipe 14 and newly installed pipe 16 are connected integrally with each other by means of hardenable filler such as cement and adhesive, which fills a space between both of the pipes.

To the existing pipe 14 is connected a second pipe 18 like a branch pipe. However, a pipe opening of the second pipe 18 is closed by the newly installed pipe 16 and filler. The apparatus 10 is adapted to open the pipe opening of the second pipe 18 to the inside of the newly installed pipe 16 by cutting away a portion of the newly installed pipe 16 and filler corresponding to the pipe opening of the second pipe with a cutter 20 rotating about an axis 19 extending in the direction orthogonal to an axis of the first pipe 12.

Further, in the illustrated embodiment, while the axis 19 corresponds to an axis extending in the radial direction of the first pipe 12, it may employ another axis extending in the axial direction of the second pipe 18 when the second pipe 18 is inclined to the first pipe 12, for example.

The apparatus 10 comprises a carriage, i.e., a frame bed 22 which is provided with a pair of elongate slide members 24 extending in the axial direction of the first pipe 12. Both of the slide members 24 are connected to each other by a plurality of connecting members 26. The frame bed 22 in the illustrated embodiment is not of a self-propelled type but it may be of a self-propelled type.

A casing 28 is installed on the frame bed 22 and a plurality of manifolds (not shown) are received in the casing 28. Inside the casing 28 there are provided a plurality of electromagnetic valves 30 for controlling the flow of operating fluid, such as operating oil and compressed air, supplied to various drive mechanisms and cylinder mechanisms which will be later described. The operating fluid and electric power are supplied to each of the electromagnetic valves 30 from an operating fluid source and a power supply installed on the ground.

On the frame bed 22 are disposed a drive mechanism 32 for angularly rotating a cutter 20 about an axis 21 extending along the axis of the first pipe 12 and a drive mechanism 34 for shifting the cutter 20 in the axial direction of the first pipe 12. The drive mechanism 32 is composed of a double-acting hydraulic rotary mechanism provided with an output shaft movable in the axial direction of the first pipe 12 and an actuator for angularly rotating the output shaft about its own axis. On the other hand, the drive mechanism 34 is composed of a double-acting hydraulic cylinder mechanism in which a piston rod is rotatable about its own axis. The piston rod of the drive mechanism 34 is connected to the output shaft of the drive mechanism 32.

As for the drive mechanisms 32,34, use may be made of a double-acting hydraulic operating mechanism functioning as the drive mechanisms 32,34 and commercially available under the name of a hydraulic stroke rotary actuator, for example.

Figure 5:
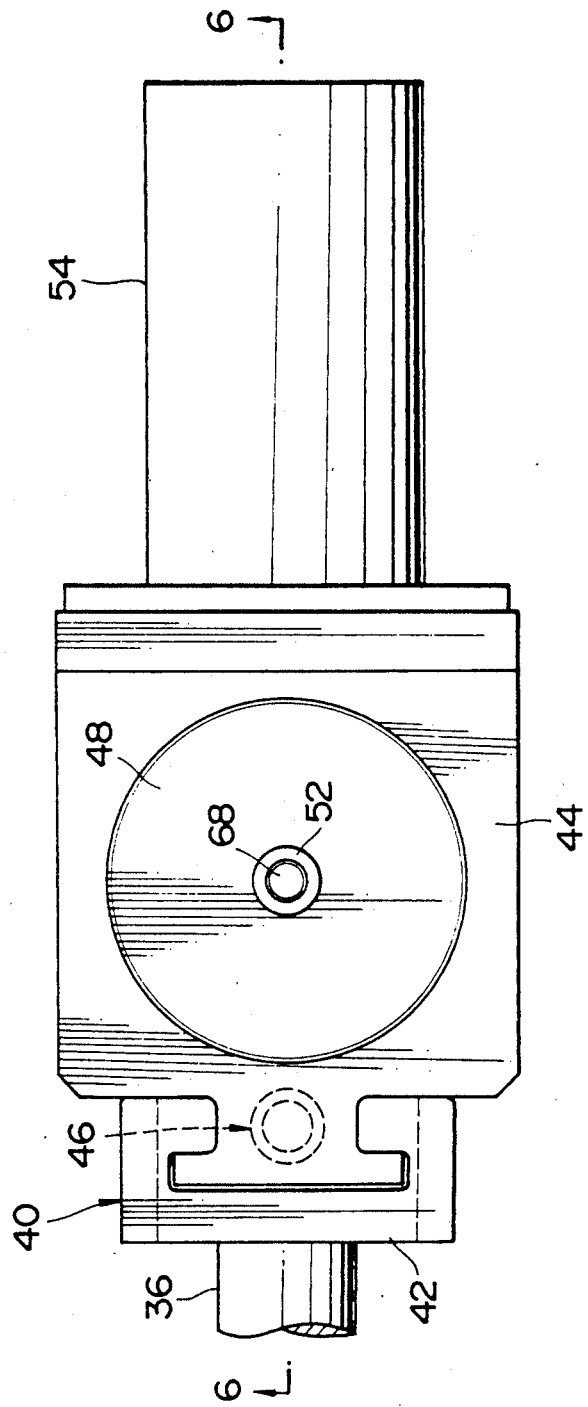
FIG. 5 is a plan view showing a front end of the apparatus in FIG. 1 with a cutter being removed.
Figure 6:
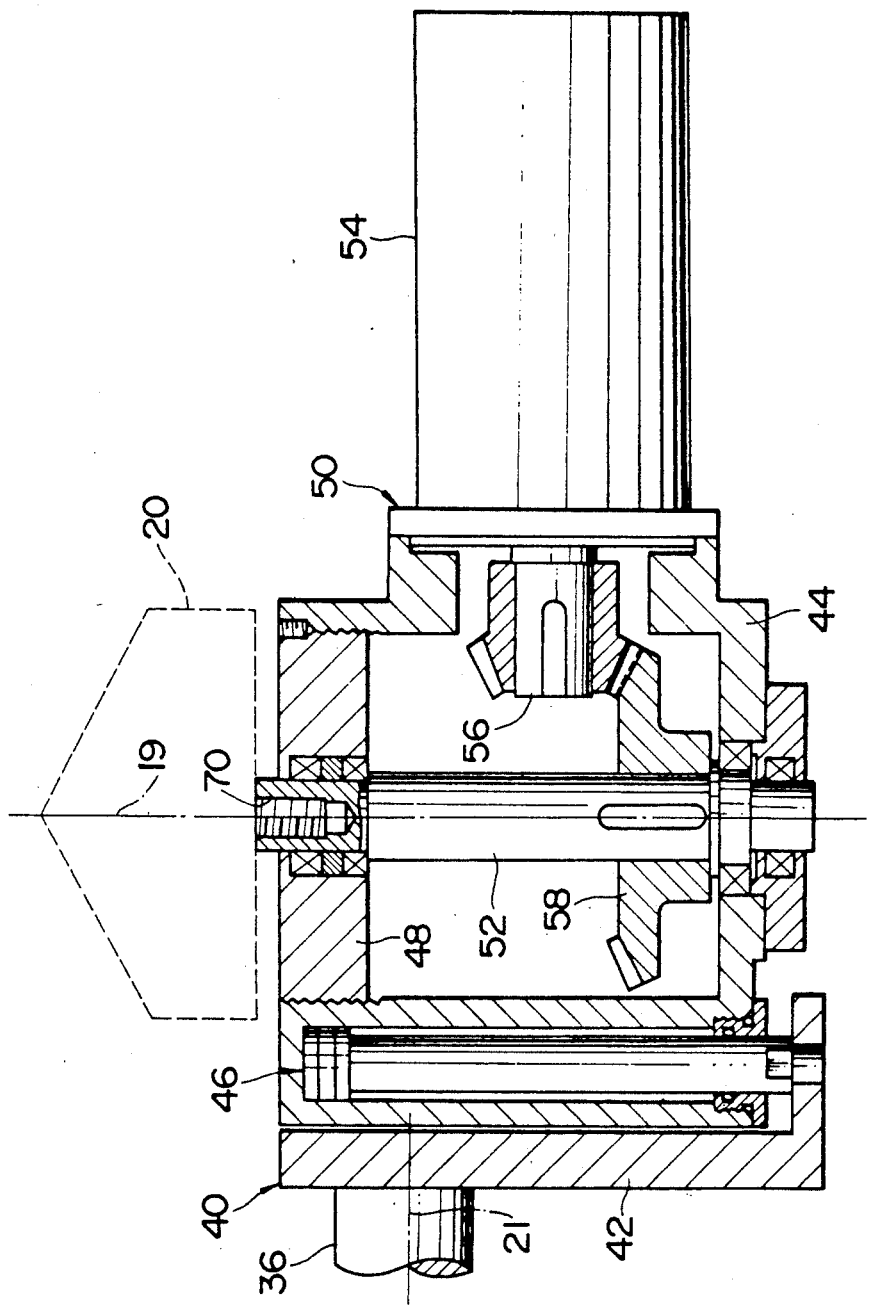
FIG. 6 is a sectional view taken along the line 6—6 in FIG. 5.

An output shaft 36 of the drive mechanism 34 extends rotatably and slidably through a bearing member 38 supported on the frame bed 22. On the front end of the output shaft 36 is mounted a drive mechanism 40 for shifting the cutter 20 in the radial direction of the first pipe 12. As shown in FIGS. 5 and 6, the drive mechanism 40 is provided with a guide rail 42 fixedly attached to the output shaft 36. A case 44 open to upward is supported on the guide rail 42 so as to be slidable along the guide rail 42. In the case 44 is disposed a vertically extending cylinder mechanism 46 so as to move the case 44 in the vertical direction relative to the guide rail 42. A cylinder chamber of the cylinder mechanism 46 is formed in the case 44 and a piston rod is connected to the lower end of the guide rail 42. The upper opening of the case 44 is closed with a lid 48.

On the case 44 is supported a drive mechanism 50 for rotating the cutter 20 about the axis 19 extending in the radial direction of the first pipe 12. As shown in FIGS. 5 and 6, the drive mechanism 50 is provided with a shaft 52 rotatably supported by the case 44 and lid 48 so as to extend in the vertical direction to support the cutter 20. To the shaft 52 is transmitted the rotation of a rotation source 54 such as a hydraulic motor supported by the case 44 through a plurality of bevel gears 56,58.

Figure 7:
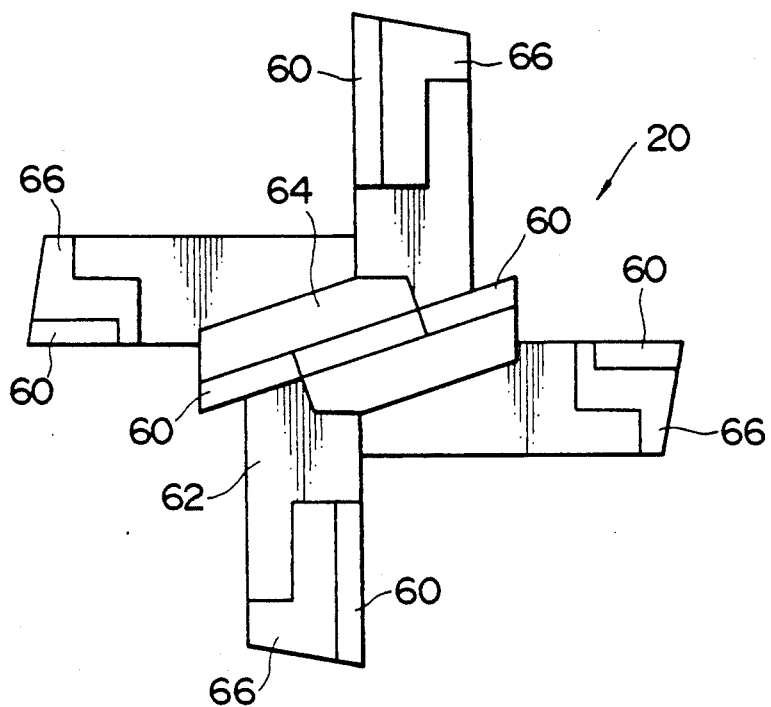
FIG. 7 is a plan view showing an embodiment of the cutter.
Figure 8:
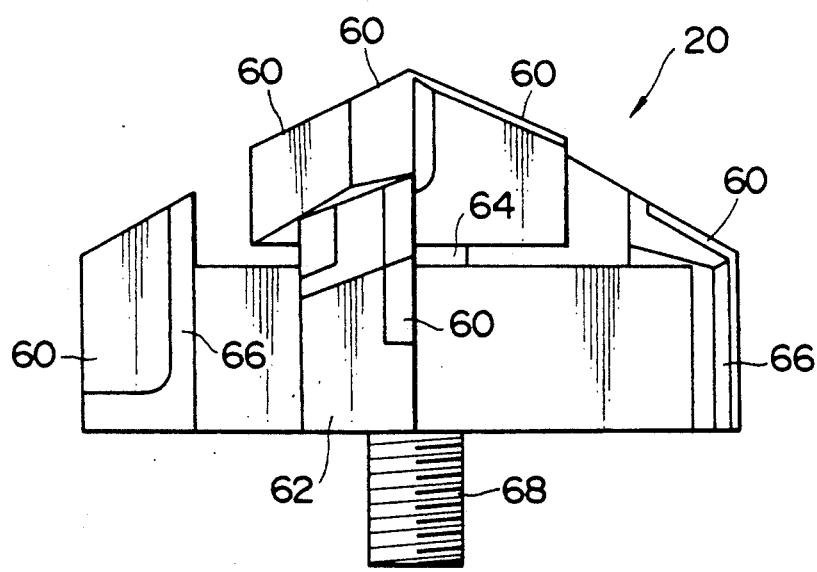
FIG. 8 is a front view showing the cutter in FIG. 7.

As shown in FIGS. 7 and 8, the cutter 20 is provided on its upper and side surfaces with a plurality of bits 60 having respective blades. A plurality of bits 60 disposed in the center are mounted on a member 64 extending upward from a cross-like base 62. On the other hand, each of other bits 60 is mounted on a corresponding one of members 66 extending upward from the corresponding ends of the base 62. When the cutter 20 is rotated, each of the bits 60 is disposed such that a conical cutting surface is formed with blades on the upper surfaces of the bits 60 and the maximum diameter of the locus of rotation of each bit 60 comes to be smaller than the inner diameter of the second pipe 18.

The base 62 is provided with a male screw 68 extending downward from the base. As shown in FIG. 6, when the cutter 20 is mounted on the shaft 52, the male screw 68 is screwed into a tapped hole 70 provided in the shaft 52.

Figure 2:
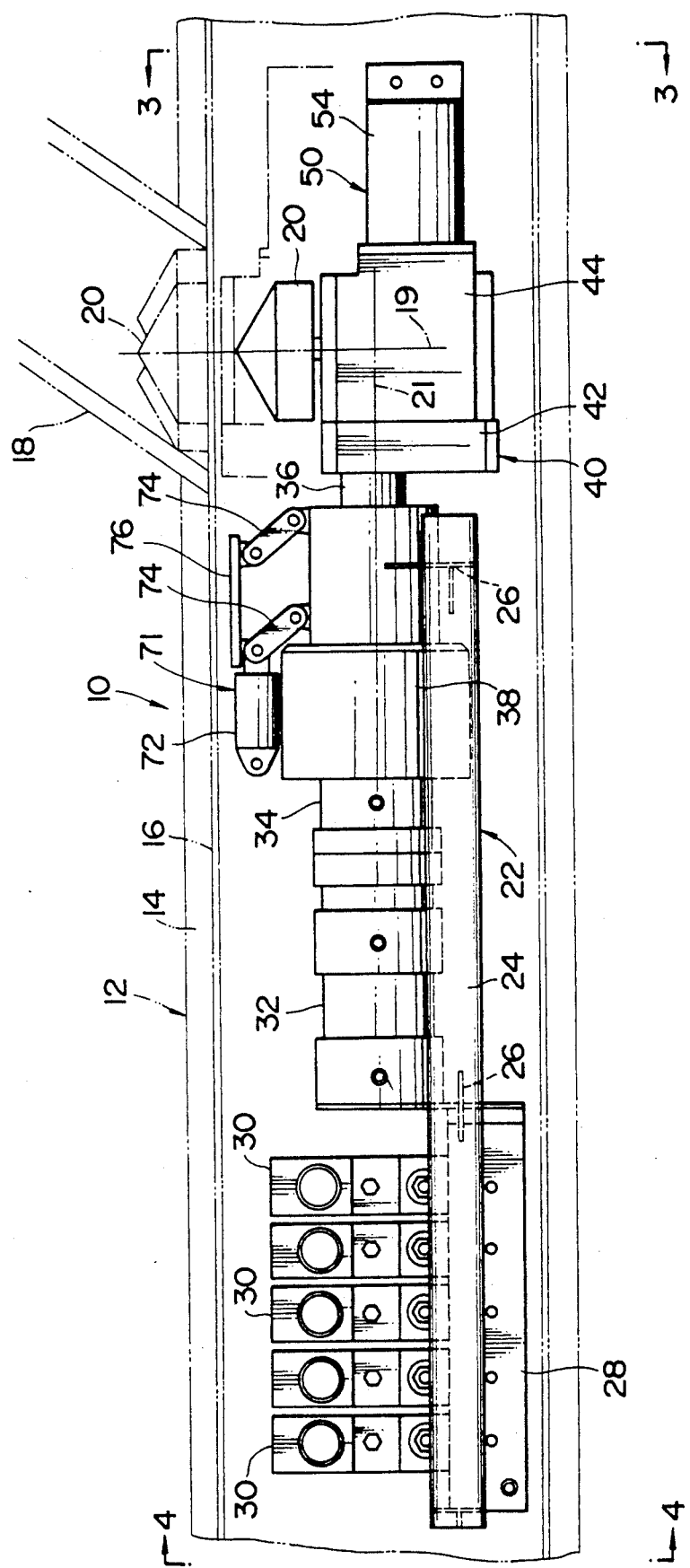
FIG. 2 is a front view showing the apparatus in FIG. 1.
Figure 3:
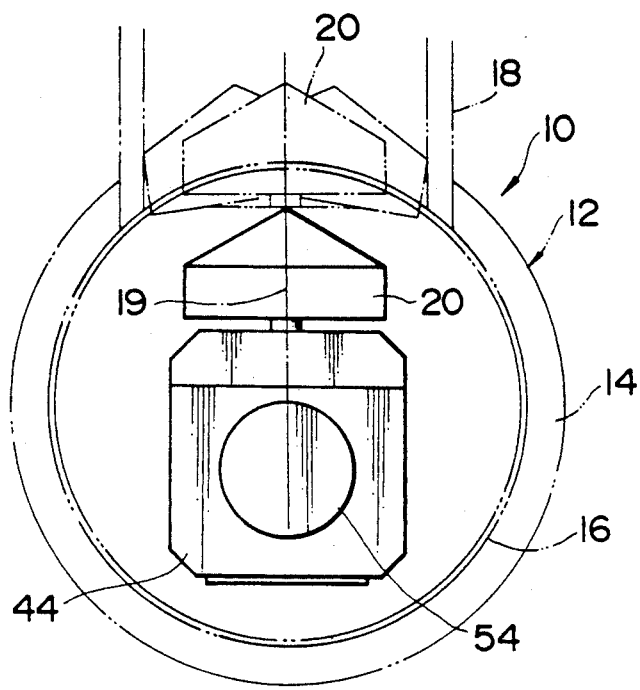
FIG. 3 is a sectional view taken along the line 3—3 in FIG. 2.
Figure 4:
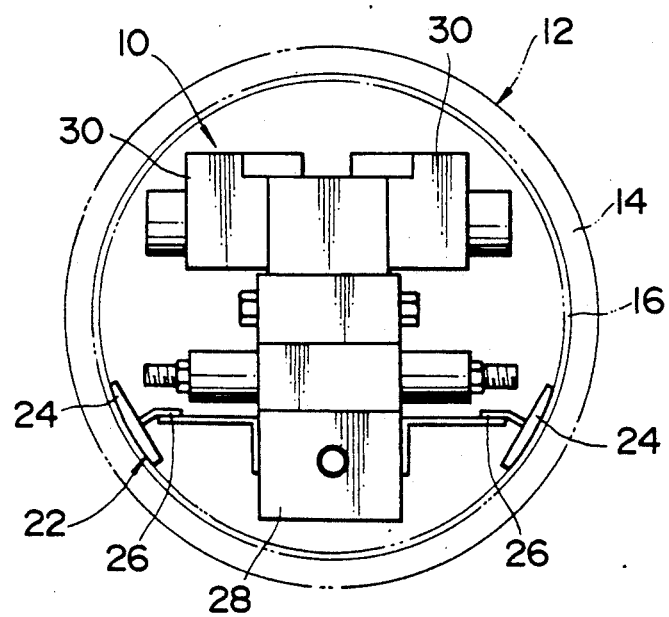
FIG. 4 is a sectional view taken along the line 4—4 in FIG. 2.

As shown in FIGS. 1 and 2, the apparatus 10 further comprises a position locking mechanism 71 for releasably fixing the frame bed 22 in position relative to the first pipe 12. The position locking mechanism 71 is provided with a cylinder mechanism 72. One end of a cylinder of the cylinder mechanism 72 is pivotally connected to the bearing member 38, while a piston rod of the cylinder mechanism 72 is pivotably connected to one of a pair of parallel links 74. One end of each of the links 74 is pivotably connected to the bearing member 38 and the other end is pivotably connected to an elongate member 76 extending in parallel to the slide member 24.

Furthermore, each of the drive mechanisms 32,34,40 and 50 may be composed of another mechanism provided with an electric drive source such as a pulse motor. Also, instead of the cylinder mechanism 72, use may be made of a mechanism provided with an electric drive source such as a solenoid mechanism and a survomotor.

Figure 9:
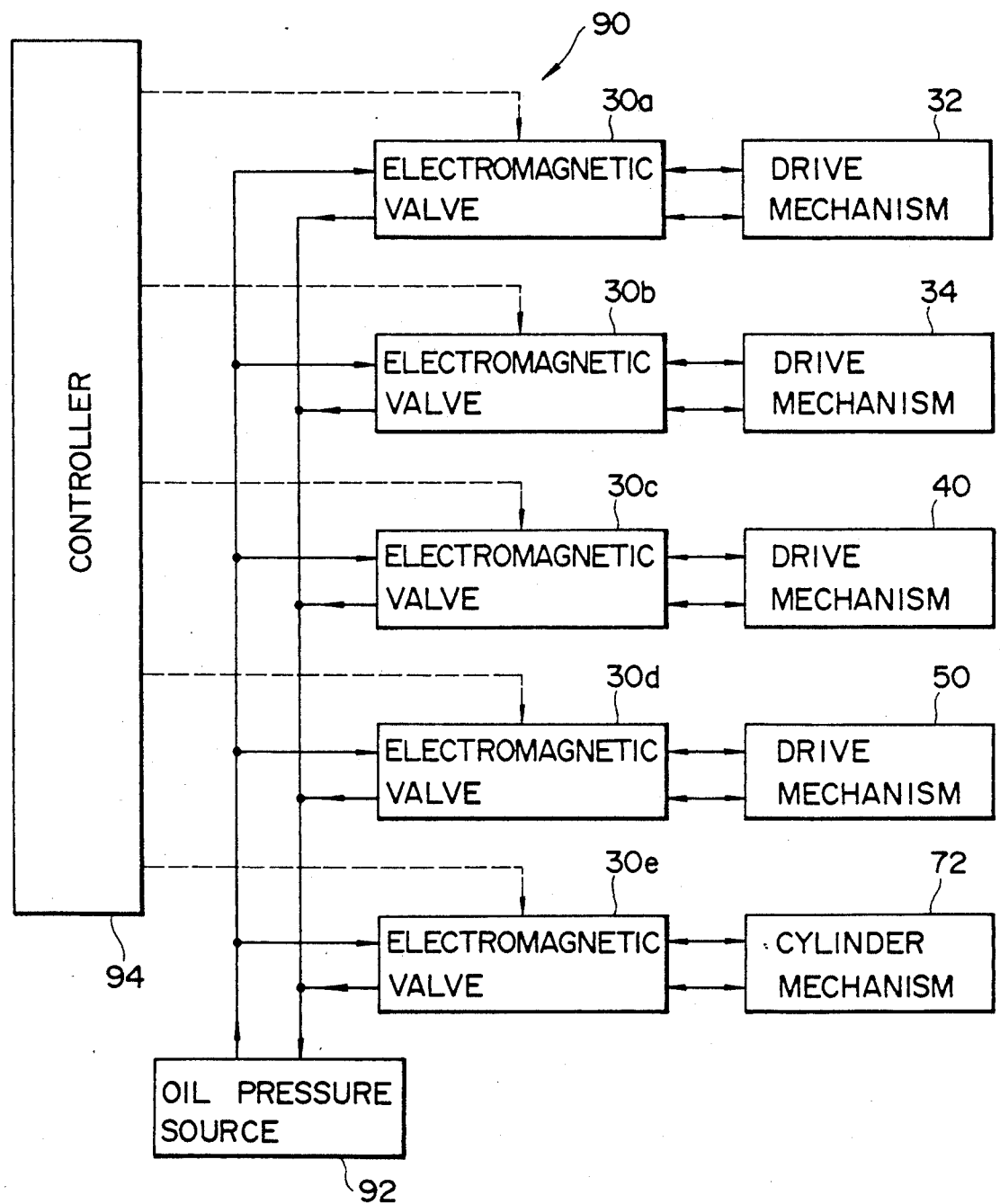
FIG. 9 is a view showing an embodiment of a controller.

As shown in FIG. 9, a controller 90 for controlling the apparatus 10 comprises electromagnetic valves 30a,30b,30c,30d and 30e corresponding individually to hydraulic apparatuses of the drive mechanisms 32,34,40 and 50 and cylinder mechanism 72, an oil pressure source 92 provided with a hydraulic pump and a control board 94 for controlling the respective electromagnetic valves. The electromagnetic valves 30a,30b,30c,30d and 30e include direction change-over valves controlled by the control board 94 to change over the fluid path of the operating oil.

The control board 94 is provided with a plurality of change-over switches individually corresponding to the electromagnetic valves. Each of the electromagnetic valves changes over the flow path of the operating oil by the corresponding one of the change-over switches.

In FIG. 9, the solid line represents the flow path of the operating oil and the dotted line represents the flow path of electric current.

Prior to the cutting operation, the apparatus 10 is first disposed in the first pipe 12 from a vertical shaft communicating to the first pipe 12 with the cylinder mechanism 74 being in a contracted state. Thereafter, the apparatus 10 is shifted to a position where the cutter 20 faces toward the pipe opening of the second pipe 18 by means of a rope and a winch. In order to shift the apparatus 10 to a predetermined position, the distance between the vertical shaft and the pipe opening of the second pipe 18 may be measured prior to installation of the newly installed pipe 16 to shift the apparatus 10 over the measured distance.

When the apparatus 10 is shifted to the predetermined position, the electromagnetic valve 30e is controlled by the control board 94 to thereby extend the cylinder mechanism 72. By so doing, the elongate member 76 is pressed against the inner surface of the pipe 16. As a result, the apparatus 10 is maintained in a position which is unmovable with respect to the pipe 12.

Further, when the portion corresponding to the pipe opening of the second pipe 18 can be monitored from the interior of the first pipe 12, the apparatus 10 is preferably determined in position such that the cutter 20 is disposed in the central portion of the pipe opening of the second pipe 18 by using a television camera and a monitor for receiving an output signal of the television camera. The positioning of the apparatus may be executed by controlling the electromagnetic valves 30a and 30b using the control board 94 while monitoring the monitor to actuate the first and second drive mechanisms 32 and 34.

At the time of the cutting operation, the cylinder mechanism 46 of the drive mechanism 40 is extended while the drive mechanism 50 is operated. Thus, since the cutter 20 is lifted along the axis extending in the radial direction of the first pipe 12 and is rotated about the axis as noted above, a hole may be bored in that portion of newly installed pipe 16 of the first pipe 12 which closes the pipe opening of the second pipe 18.

Next, the drive mechanisms 32 and 34 are operated at least once, preferably over and over while the drive mechanism 50 is operated with the cylinder mechanism 46 being in an extended state. Thus, since the cutter 20 reciprocates at least once in the axial direction of the first pipe 12 and in the circumferential direction of the first pipe 12 respectively, the hole as noted above is expanded.

At the time of the cutting operation, when the cutter 20 is shifted by the drive mechanisms 32 and 34 so that the angular displacement, i.e., chord size in the locus of reciprocation in the circumferential direction of the first pipe, of the rotary axis of the cutter 20 is identical with the displacement in the axial direction of the first pipe 12, the locus of motion of the cutter 20 results in a circle. On the other hand, when the cutter 20 is shifted by the drive mechanisms 32 and 34 so that the angular displacement comes to be larger than the displacement in the axial direction of the first pipe 12, the locus of motion of the cutter 20 results in an ellipse having a longer axis extending in the circumferential direction of the first pipe 12. Also, when the cutter 20 is shifted by the drive mechanisms 32 and 34 so that the angular displacement comes to be smaller than the displacement in the axial direction of the first pipe 12, the locus of motion of the cutter 20 results in an ellipse having a longer axis extending in the axial direction of the first pipe 12.

By adjusting the timing in which the angular displacement comes to the maximum value and the timing in which the axial displacement comes to the maximum value, it is possible to set the direction of the long axis of the ellipse at will. Also, by adjusting the angular displacement and axial displacement, the locus of motion of the cutter 20 results in any desired ellipse in shape and size. Therefore, any desired hole in shape and size can be bored in accordance with the apparatus 10.

During the cutting process, a portion to be cut may be monitored by the television camera and the monitor. In this case, each of the drive mechanisms and cylinder mechanisms may be manually controlled by utilizing the control board 94. More preferably, the control of each of the drive mechanisms and cylinder mechanisms is executed by a computer. By so doing, the boring operation may be effected without requirement of any skill.

Further, when a pulse motor or servo-motor is used for the drive source of the drive mechanisms 32, 34, it is preferable that the angular displacement of the cutter 20 about the axis extending along the first pipe 12 and the displacement of the cutter 20 in the axial direction of the first pipe 12 are gradually increased while the drive mechanism 50 is operated and while the drive mechanisms 32, 34 are repetitively operated. In consequence, the hole as noted above is gradually expanded.

Figure 10:
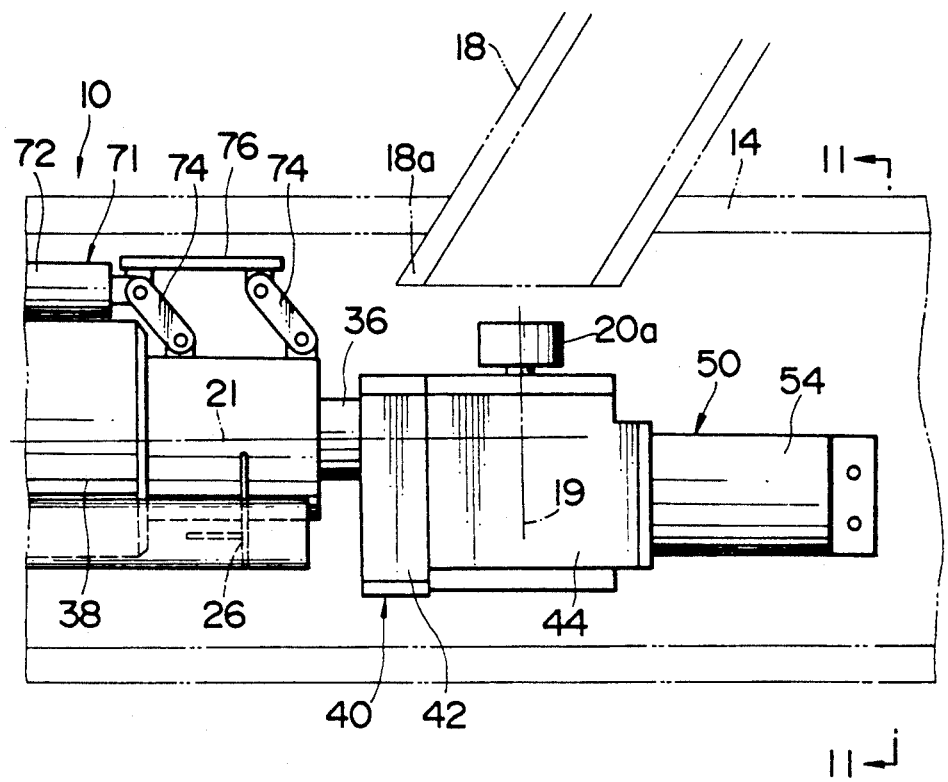
FIG. 10 is a view showing an embodiment of the apparatus in a case which is used for cutting protrusions.
Figure 11:
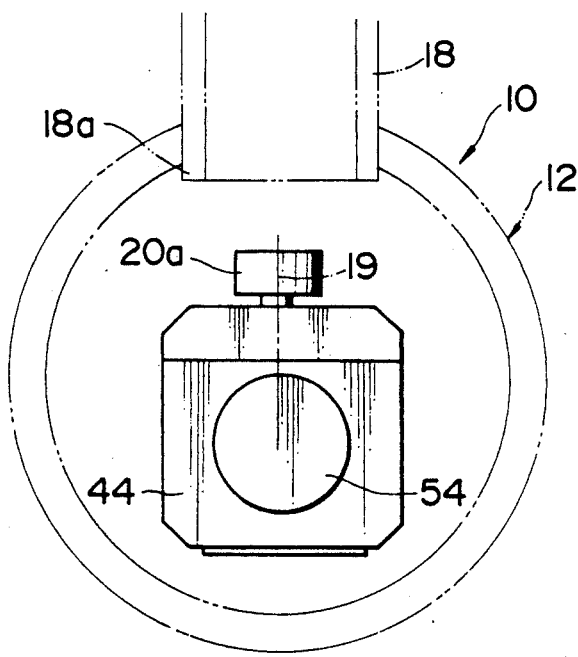
FIG. 11 is a sectional view taken along the line 11—11 in FIG. 10.

As shown in FIGS. 10 and 11, when the apparatus 10 is used as an apparatus for removing protrusions such as a projection 18a of the second pipe 18 extending into the first pipe 12, use is made of a cutter 20a having a predetermined thickness and displaying a locus of rotation of a disk. The shape and size of the cutter 20a are set so that the maximum diameter of the locus of the cutter 20a rotating about its own rotary axis is smaller than that of a portion to be cut. As for the cutter 20a, use may be made of a cutter provided with a plurality of bits or a grinder-like cutter. For example, the grinder-like cutter may be disposed in front of the motor 54 so that the rotary axis of the cutter extends parallel to the axis 21.

At the time of cutting the protrusions, the apparatus 10 is operated in the same way as in the case of boring a hole. Therefore, since the cutter 20a is angularly displaced around the axis extending along the axis of the first pipe 12 and is rotated around the rotary axis of the cutter by the drive mechanisms 32, 34 while the cutter 20a is shifted in the direction of the axis 21 extending along the first pipe 12, the protrusion may be securely cut away up to the proximity of the inner surface of the first pipe 12.

Figure 12:
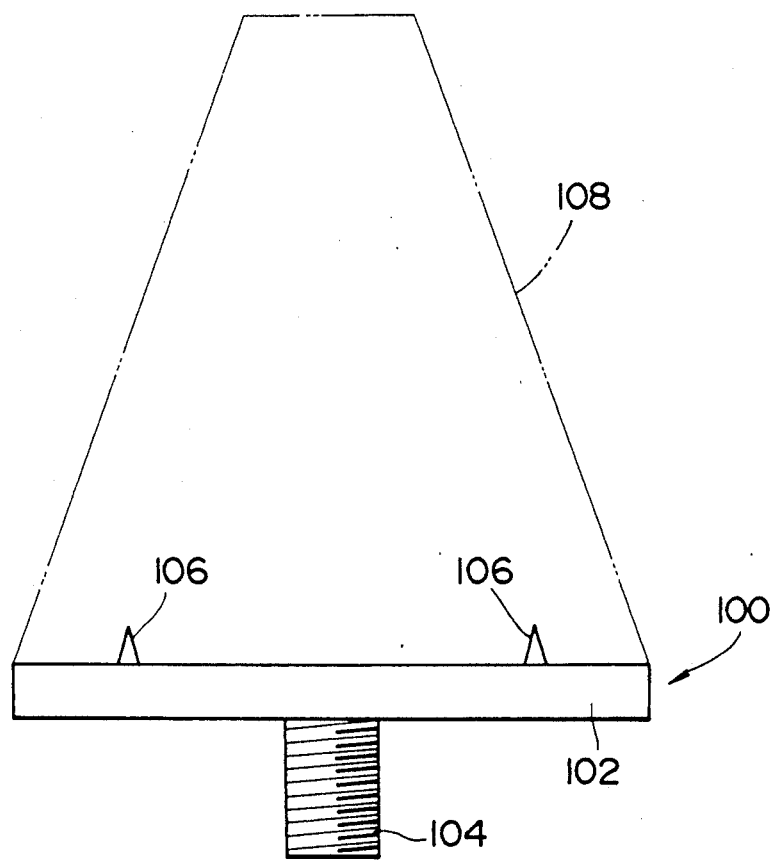
FIG. 12 is a front view showing an embodiment of a fixture of a plug of cutoff.

When the apparatus 10 is used as an apparatus for disposing a plug of cutoff in the front end of the second pipe 18, a fixture 100 is used in lieu of the cutter 20 as shown in FIG. 12, for example. The fixture 100 is provided with a disk-like base 102, a male screw portion 104 extending downward from the center of the base and a plurality of projections 106 provided on the upper surface of the base 102. When the fixture 100 is mounted on the rotary shaft 52 of the drive mechanism 50, the male screw portion 104 is screwed into the tapped hole 70 formed in the rotary shaft 52. A plug 108 of cutoff in the illustrated embodiment is made of rubber or cork and removably positioned on the base 102 by the projections 106.

The operation of closing the front end of the second pipe 18 with the plug 108 of cutoff is carried out before the newly installed pipe 16 is disposed in the existing pipe 14. More specifically, the apparatus 10 is disposed in a predetermined position and the drive mechanism 40 is operated while the drive mechanism 50 is operated under the condition that the plug 108 of cutoff faces toward the front end of the second pipe 18 by properly operating the drive mechanisms 32, 34 to thereby close the front end of the second pipe 18 with the plug 108 of cutoff. By so doing, the plug 108 of cutoff is forced into the front end of the second pipe 18.

Further, if the plug 108 of cutoff is formed on its outer peripheral surface with a screw, it is possible to prevent the plug 108 of cutoff from getting out of the second pipe 18.

Figure 13:
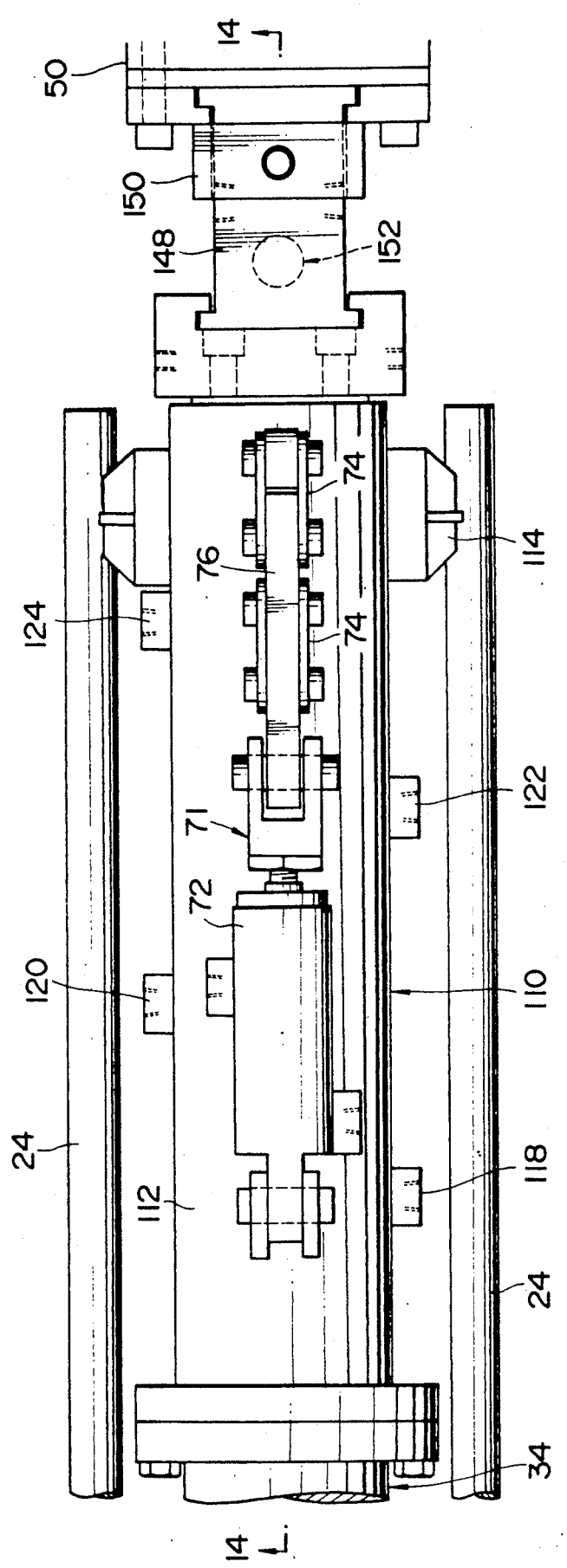
FIG. 13 is an enlarged-scale plan view showing a fluid guide mechanism.
Figure 14:
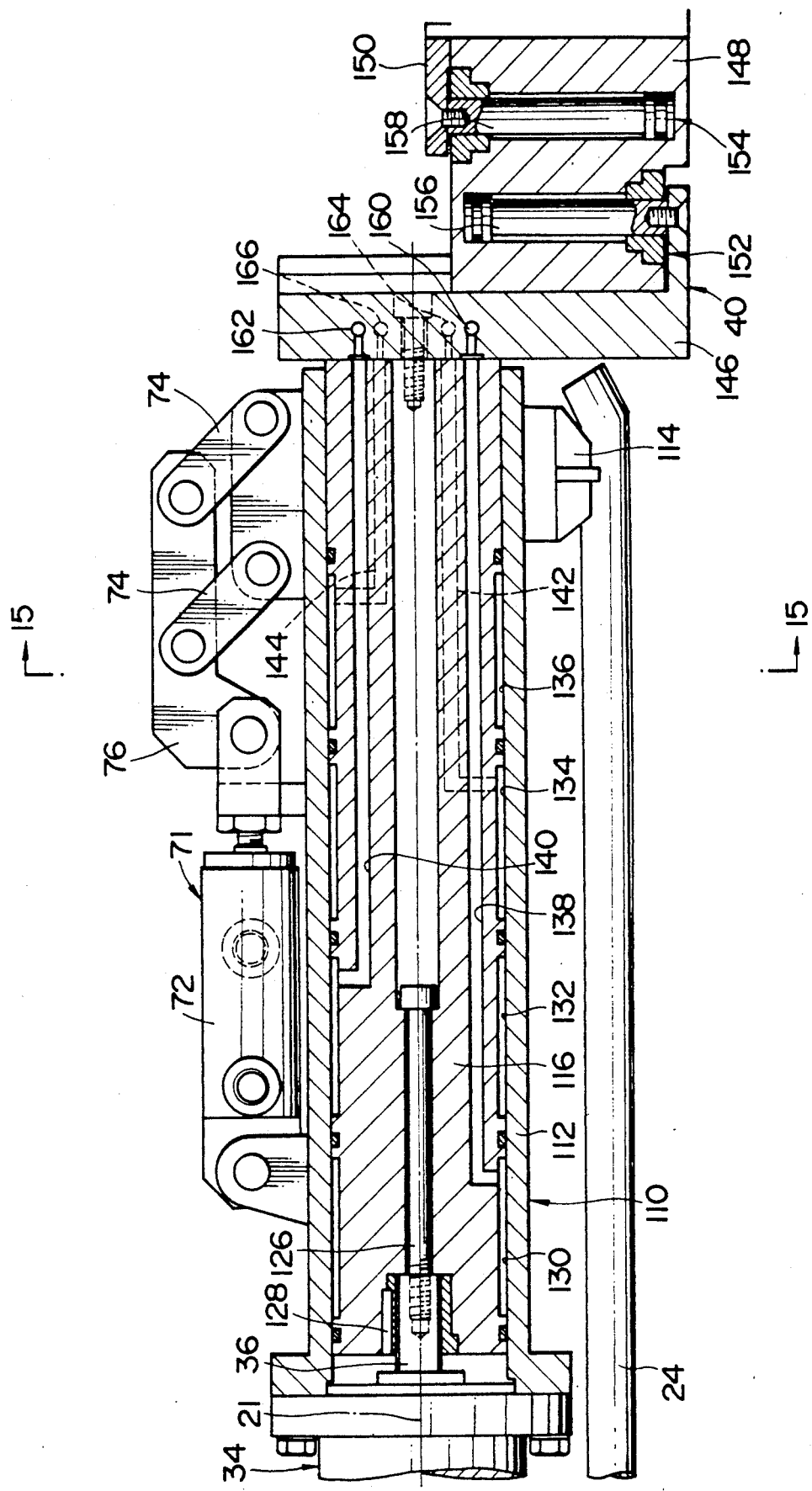
FIG. 14 is a sectional view taken along the line 14—14 in FIG. 13.
Figure 15:
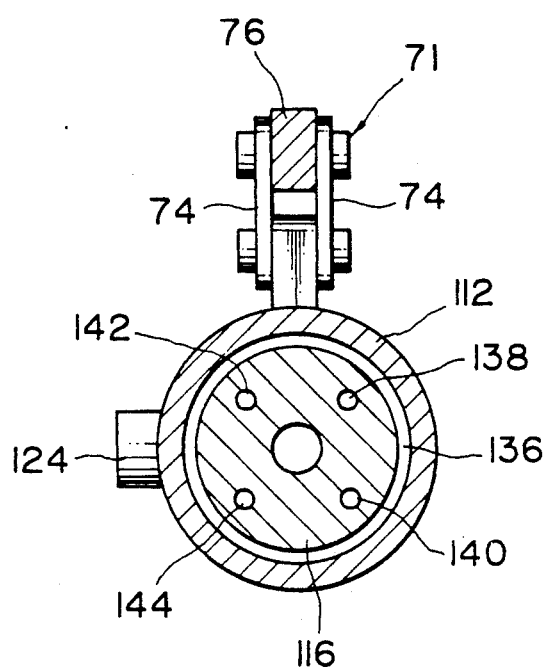
FIG. 15 is a sectional view taken along the line 15—15 in FIG. 14.

As shown in FIGS. 13 through 15, instead of using the bearing member 38, a fluid guide mechanism 110 defining the flow path of the operating oil may be disposed between the drive mechanisms 34, 40.

The fluid guide mechanism 110 is provided with a tubular receiving member 112 supported by the drive mechanism 34 and a connecting member 114 so as to extend in parallel to the axis 21, and a rod 116 disposed in the receiving member or carrier member 112 so as to be rotatable about the axis 21 and capable of reciprocating in parallel to the axis 21.

The receiving member 112 includes two pairs of ports 118, 120 and 122, 124 extending through the receiving member 112 from the outside to the inside. Each of the ports 118, 120, 122 and 124 is connected to the electromagnetic valve 30 as shown in FIGS. 1 and 2 through a hose (not shown).

The rod 116 is connected to the shaft 36 by means of a bolt 126 and a key 128 so that the rear end face of the rod butts against the front end face of the shaft 36 of the drive mechanism 34. The rod 116 has a plurality of recesses 130, 132, 134 and 136 extending circumferentially on the outer periphery of the rod while being spaced apart from each other in the axial direction of the rod 116. Each of the recesses 130, 132, 134 and 136 communicates to the corresponding one of the ports 118, 120, 122 and 124. A packing for blocking the operating oil from flowing to the adjacent recess is disposed between the adjacent recesses on the outer periphery of the rod 116.

The width of each of the recesses 130, 132, 134 and 136 in the axial direction of the shaft 36 is set to be larger than the maximum stroke of the shaft 36 so as to prevent the recesses 130, 132, 134 and 136 from getting out of the corresponding ports 118, 120, 122 and 124 of the receiving member 112 even if the rod 116 is shifted relative to the receiving member 112 along with the movement of the shaft 36.

The rod 116 further has a plurality of holes 138, 140, 142 and 144 extending toward the front end face of the rod 116 along the axis 21. Each of the holes 138, 140, 142 and 144 communicates to the corresponding one of the recesses 130, 132, 134 and 136 and opens to the front end face of the rod 116.

The drive mechanism 40 is mounted on the front end of the rod 116. The drive mechanism 40 as shown in FIGS. 13 and 14 is provided with a guide rail 146 fixedly attached to the front end of the rod 116 by means of a plurality of bolts, a first slider 148 supported on the opposite side of the guide rail 146 to the rod 116 so as to be slidable in the direction of the rotary axis 19 of the cutter 20 and a second slider 150 supported on the first slider 148 so as to be slidable in the direction of the rotary axis of the cutter 20.

The drive mechanism 40 as shown in FIGS. 13 and 14 is further provided with a pair of double-acting hydraulic cylinder mechanisms 152, 154 formed in the first slider 148 so as to move the cutter 20 in the direction of the rotary axis 19 of the cutter.

A piston rod 156 of the cylinder mechanism 152 projects from the first slider 148 downward and is attached fixedly in position to the lower portion of the guide rail 146 by means of a screw. A piston rod 158 of the cylinder mechanism 154 projects from the first slider 148 upwards and is connected removably to the second slider 150 by means of a screw.

The guide rail 146 includes two pairs of ports 160, 162 and 164, 166 for use of the operating oil. Each of the ports 160, 162, 164 and 166 communicates to the corresponding one of the holes 138, 140, 142 and 144 in the rod 116. The port 160 communicates in common to both cylinder chambers on the extension side of the cylinder mechanisms 152, 154 while the port 162 communicates in common to both cylinder chambers on the contraction side of the cylinder mechanisms 152, 154. Also, the port 164, 166 are connected to the rotation source 54 of the drive mechanism 50.

The drive mechanism 50 for rotating the cutter 20 about its own rotary axis 19 is supported by the second slider 150 in front of the drive mechanism 40. Also, the position locking mechanism 71 for releasably fixing the position of the apparatus 10 relative to the first pipe 12 is mounted on the receiving member 112.

When the operation is done, the operating fluid for use in the drive mechanisms 40, 50 passes through the ports 118,120,122 and 124, recesses 130,132,134 and 136 and holes 138,140,142 and 144 of the fluid guide mechanism 110. Thus, when the fluid guide mechanism 110 is used for guiding the operating fluid, it is not necessary to directly connect the drive mechanisms 40,50 to the electromagnetic valves 30 by means of flexible hoses even if the drive mechanisms 40, 50 are so constructed to rotate and shift relative to the drive mechanisms 32,34. In consequence, the angular rotation of the cutter 20 around the axis 21 and the movement of the cutter 20 in the direction of the axis 21 is smoothened.

Figure 16:
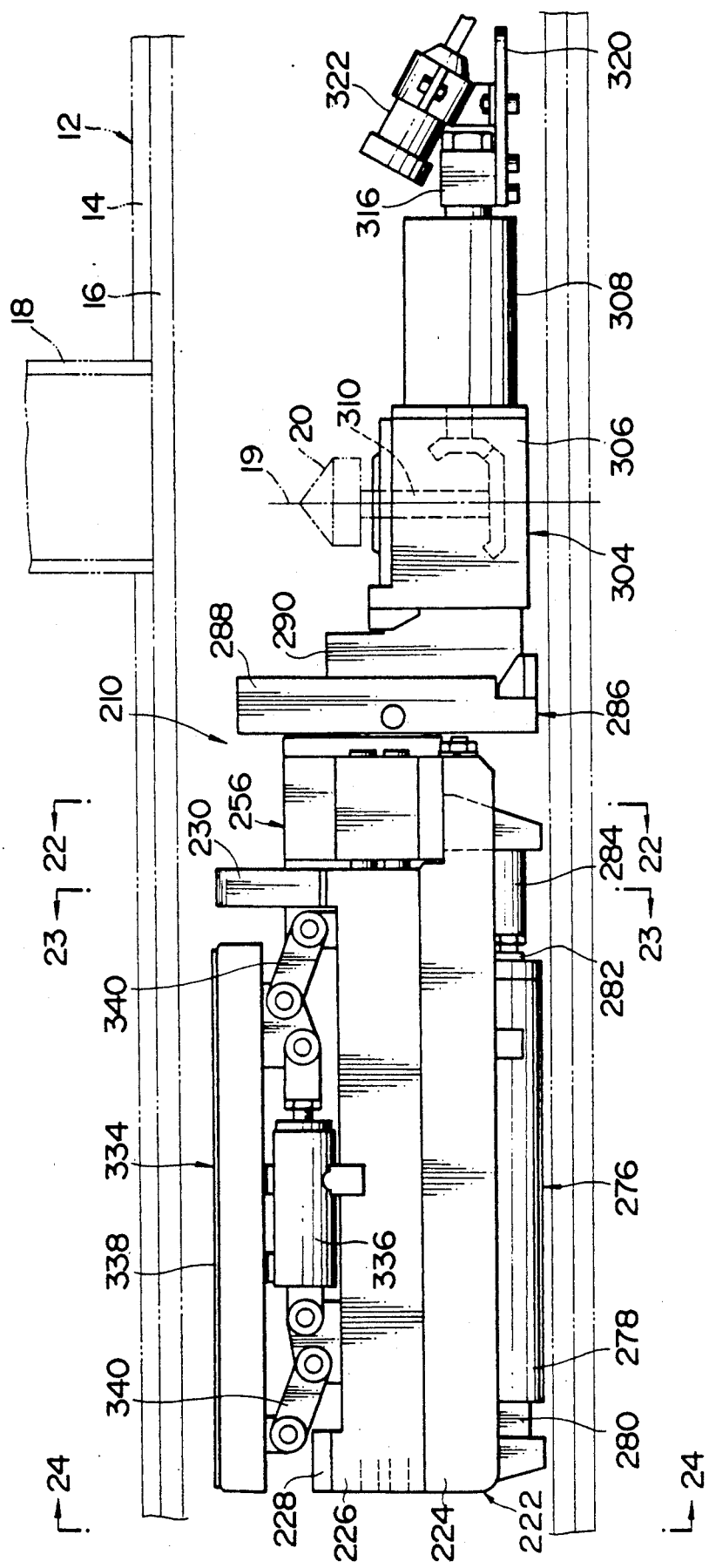
FIG. 16 is a front view showing another embodiment of the apparatus according to the present invention.
Figure 17:
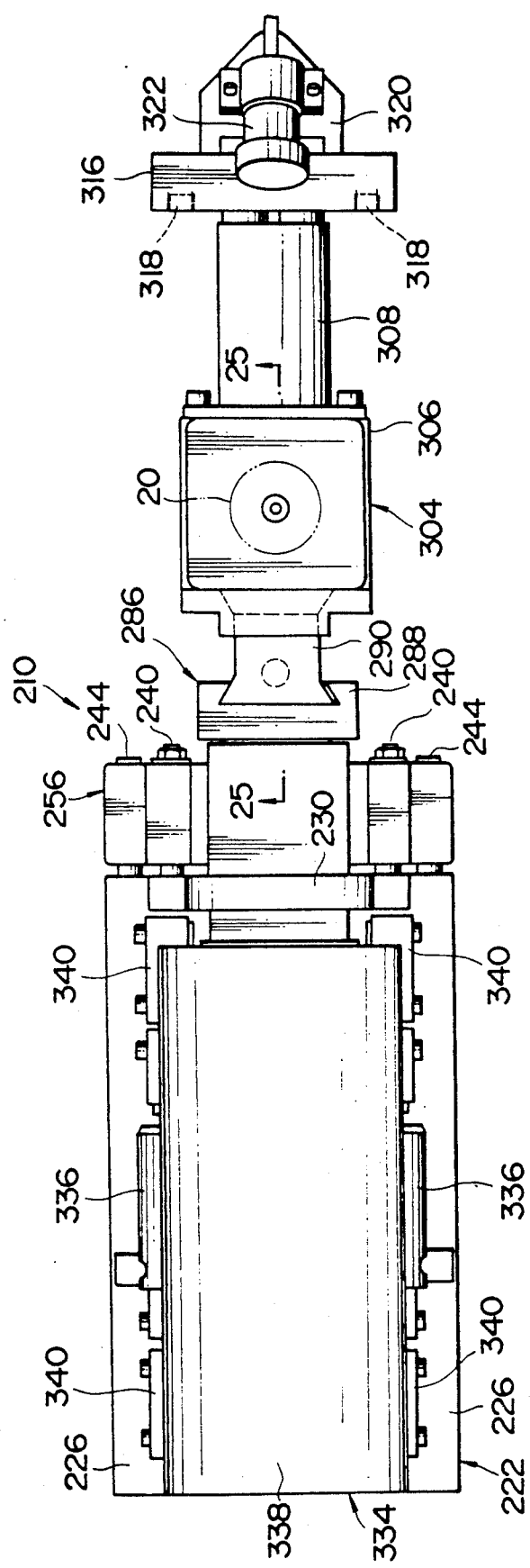
FIG. 17 is a plan view showing the apparatus in FIG. 16.

An apparatus 210 as shown in FIGS. 16 and 17 is used as an apparatus for cutting away a portion of the newly installed pipe 16 and filler by means of the cutter 20 rotated about its own axis 19 to thereby open the pipe opening of the second pipe 18 to the newly installed pipe 16.

The apparatus 210 comprises a support bed like a carriage, i.e., a support mechanism 222 disposed in the first pipe 12 so as to be movable in the axial direction of the pipe 12. The support mechanism 222 is provided with a pair of elongate slide members 224 extending in parallel to each other in the axial direction of the first pipe 12. The support mechanism 222 cannot travel by itself, but it may employ a self-propelled carriage.

Figure 23:
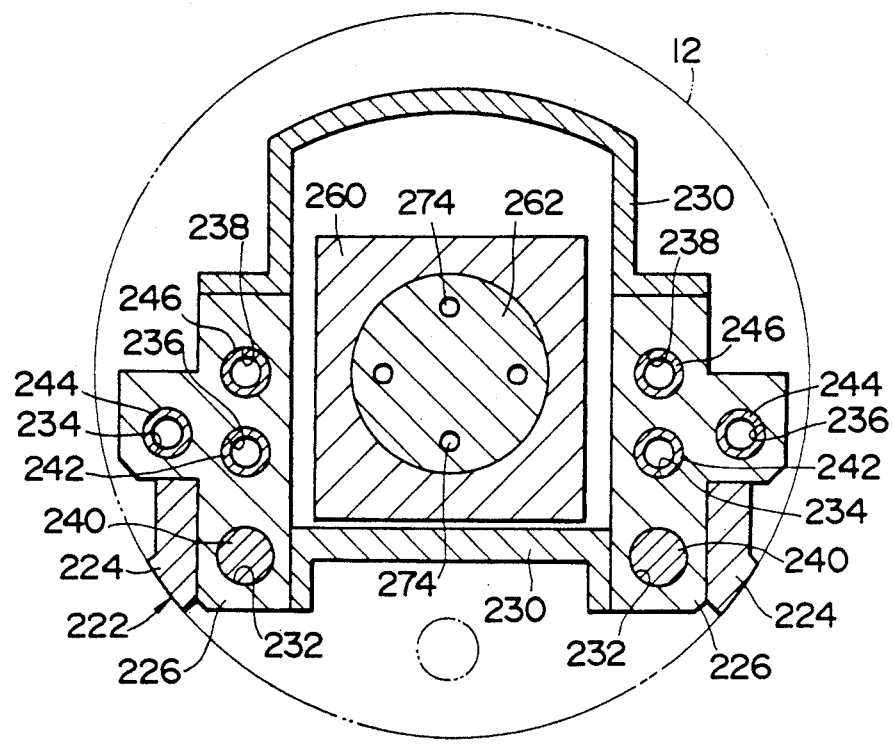
FIG. 23 is a sectional view taken along the line 23—23 in FIG. 16.
Figure 24:
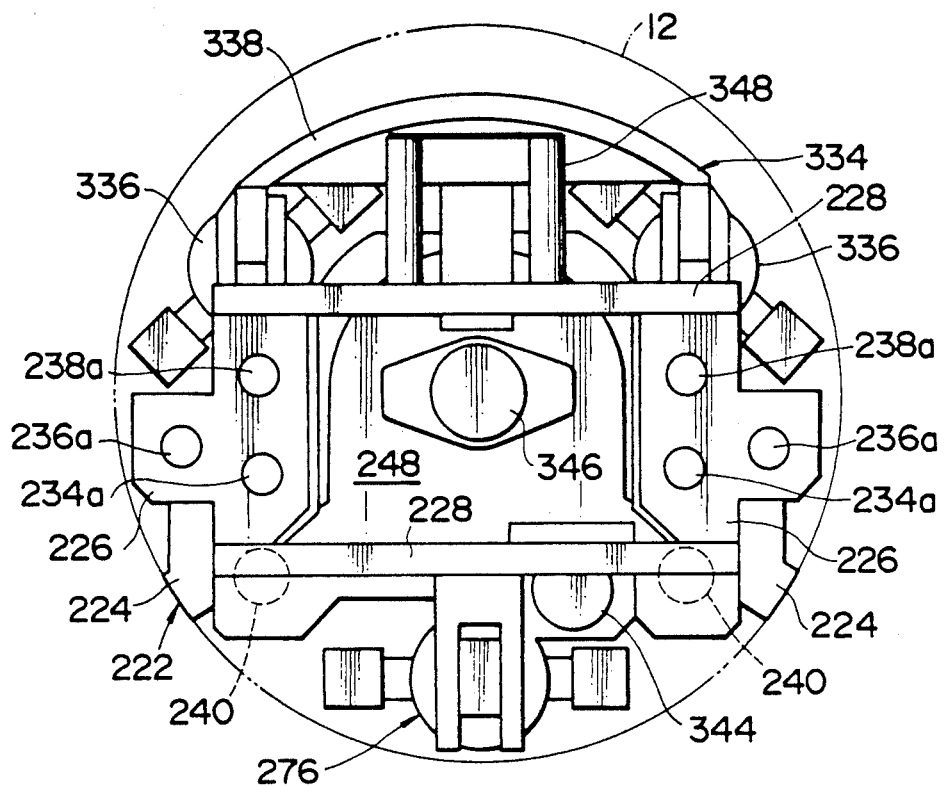
FIG. 24 is a side view taken along the line 24—24 in FIG. 16.

As shown in FIGS. 23 and 24, when the apparatus 210 is disposed in the first pipe 12, each of the slide members 224 is attached fixedly in position to the side surface of each of the first elongate members 226 so as to be slidably in contact with the inner surface of the first pipe 12. Both of the first members 226 extend in parallel to each other in the axial direction of the first pipe 12 and are interconnected at both ends of the first members 226 by connecting members 228 and 230 without being movable relative to each other.

As shown in FIGS. 20,21,23 and 24, each of the first members 226 is formed with four holes 232,234,236 and 238 extending through the first member 226 in the longitudinal direction thereof. The rear end (as being indicated at the left end in FIGS. 16 and 17) of each of the holes 234,236 and 238 other than the hole 232 formed at the lowermost portion provides a corresponding one of ports 234a,236a and 238a for receiving the operating fluid. A hose (not shown) connected to an operating fluid source is connected to the corresponding one of the ports.

The lowermost hole 232 receives a shaft 240 so as to be movable in the axial direction of the shaft. On the other hand, other holes 234,236 and 238 receive respectively the second tubular members 242,244 and 246 so as to be movable in the axial direction of the second members and prevent the operating fluid from leakage therefrom. The front end of each of the second members 242,244 and 246 is protruded forward from the first member 226 and closed.

Figure 18:
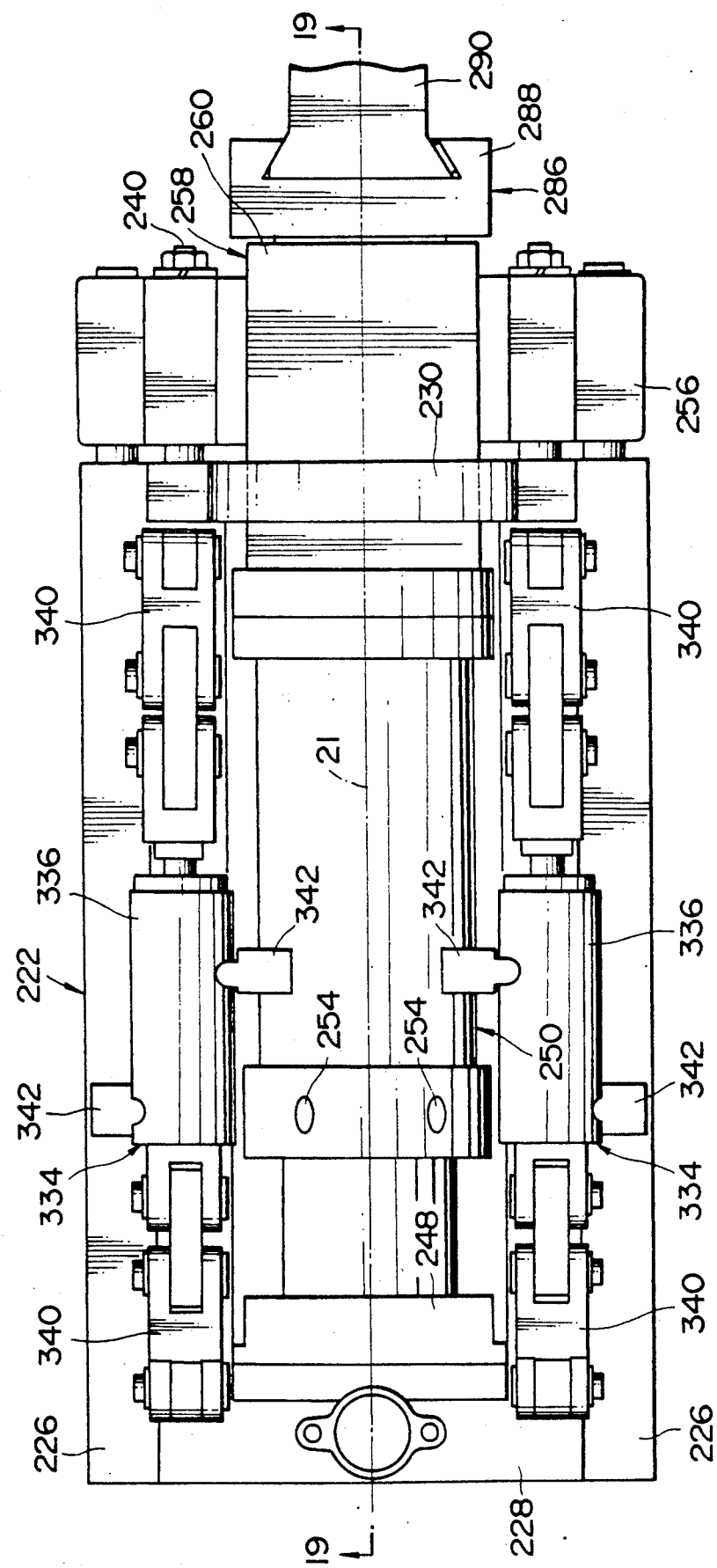
FIG. 18 is an enlarged-scale fragmentary plan view showing a support mechanism and a position locking mechanism with a pad plate of the apparatus in FIG. 16 being removed.
Figure 19:
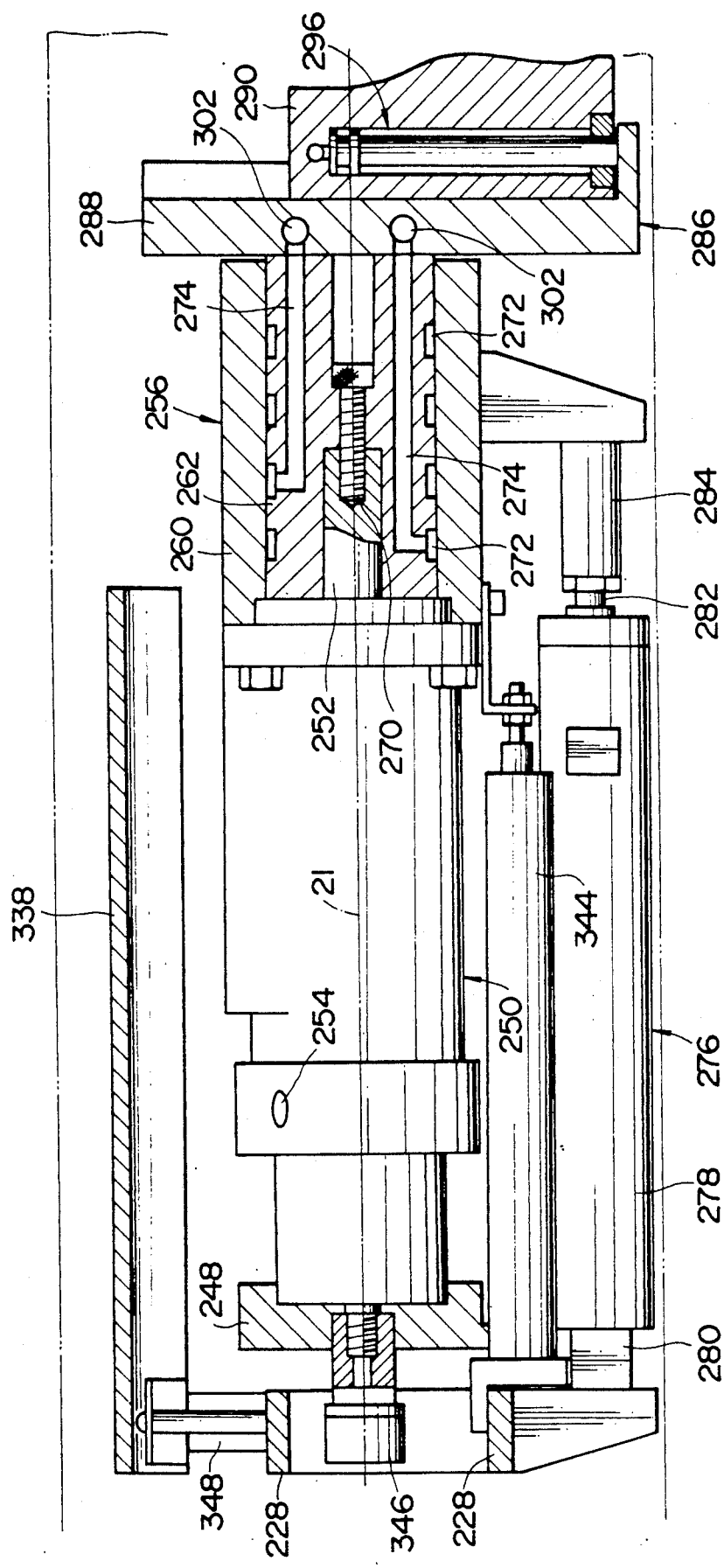
FIG. 19 is a sectional view taken along the line 19—19 in FIG. 18.
Figure 20:
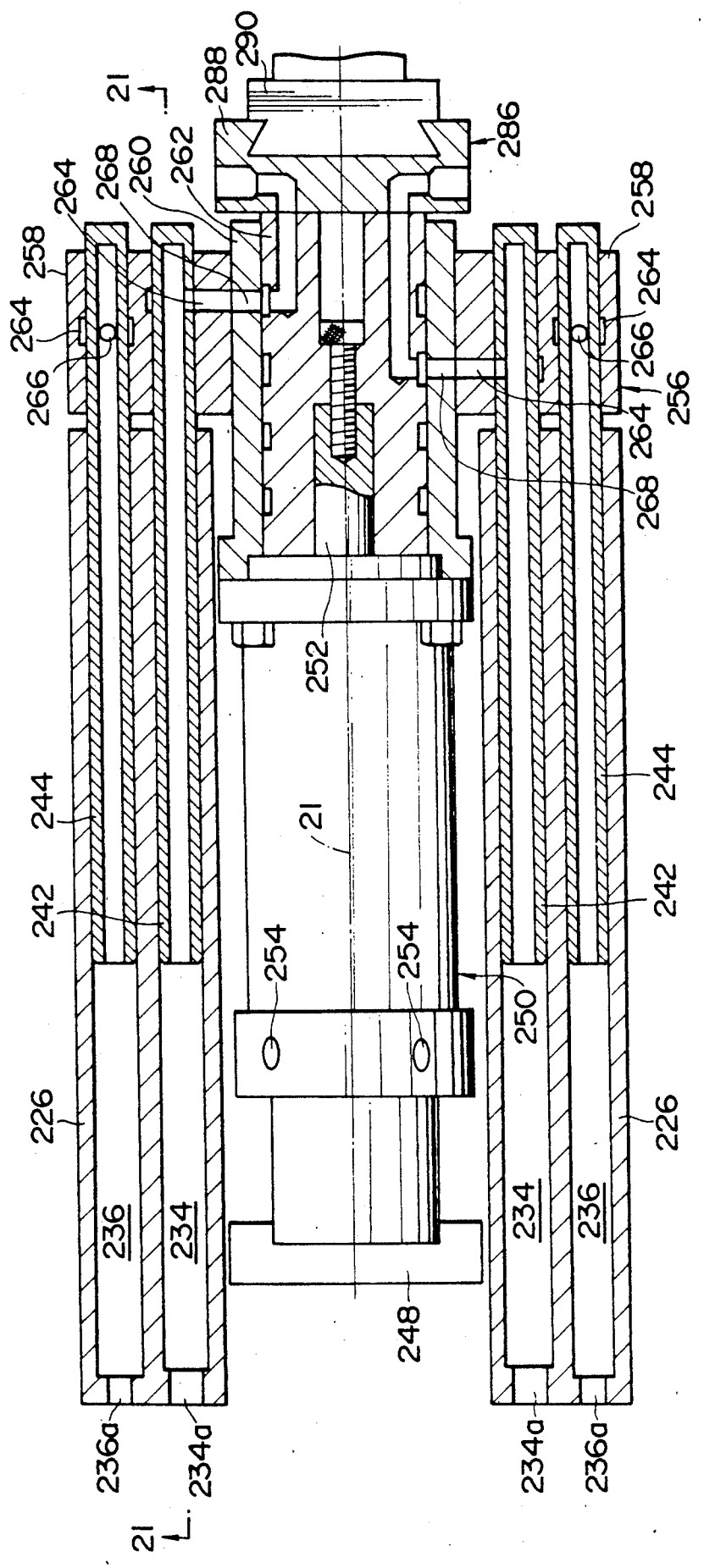
FIG. 20 is a cross-sectional view showing the connective relationship between a second member of the support mechanism and the fluid guide mechanism.

Both of the shafts 240 are interconnected on both rear ends by a connecting member 248 as shown in FIGS. 18,20,21 and 24 without being movable relative to each other. As shown in FIGS. 18 through 20, a drive mechanism 250 for angularly rotating the rotary axis 19 of the cutter 20 about the axis 21 extending along the axis of the first pipe 12 is mounted on the connecting member 248 so as to extend forward from the connecting member 248 between both of the first members 226.

As for the drive mechanism 250, use may be made of a double-acting rotary hydraulic mechanism functioning as a rotary source and commercially available under the name of a hydraulic rotary actuator, for example. However, other mechanisms may be available.

The drive mechanism 250 includes a pair of ports 254 for use of the operating fluid and adapted to swing, i.e., angularly rotate a shaft 252 of the drive mechanism 250 about the axis 21. Each of the ports 254 communicates to the interior of the front end of the second member 244 through a hose (not shown). If the operating fluid is supplied to one port 254, the drive mechanism 250 rotates shaft 252 in one direction about the axis 21. If the operating fluid is supplied to the other port 254, the drive mechanism 250 rotates the shaft 252 in the opposite direction to the aforementioned one.

Both of the shafts 240 are also interconnected on both front ends by a fluid guide mechanism 256 for guiding the operating fluid without being movable relative to each other. As shown in FIGS. 18 through 22, the fluid guide mechanism 256 is provided with a pair of coupling blocks 258 attached fixedly to the front end of the shaft 240, a tubular receiving member or carrier member 260 attached fixedly to both of the blocks 258 so as to extend in parallel to the axis 21 between both of the first members 226 and a rod 262 received in the receiving member 260 so as to be rotatable about the axis 21.

Each of the blocks 258 is formed with four holes extending through the block 258 in parallel to the axis 21. Each hole is provided at a spot corresponding to the hole formed in the first member 226 of the support mechanism 222. In each hole of the block 258 is fitted the front end of the shaft 240 or second member 242,244 or 246. The shaft 240 and second members 242,244 and 246 are attached fixedly to the block 258.

Each block 258 is formed with a plurality of flow paths 264 for use of the operating fluid. Each of the flow paths 264 is connected to the predetermined one of the second members 242,244 and 246. Each of the second members 242,244 is formed with a hole 266 for connecting the interior of the second member to the corresponding one of the flow paths 264.

The receiving member 260 is connected on its front end to the rear end of the drive mechanism 250 by means of a plurality of bolts. The receiving member 260 includes two pairs of flow paths 268 extending through the receiving member 260 from the outside to the inside. Each of the flow paths 268 communicates to a flow path of the predetermined one of the second members 242 and 246 through a predetermined one of the flow paths 264 of the block 258. Further, the flow path 264 communicating to the flow path in the second member 244, as mentioned above, communicates to the port 254 in the drive mechanism 250 through a hose (not shown).

As shown in FIGS. 19 and 20, the rod 262 of the fluid guide mechanism 256 is connected to the front end of the shaft 252 by means of a bolt 270 and a key (not shown) without relative rotation and movement between the rod 262 and the shaft 252. The rod 262 includes a plurality of annular recesses 272 extending in the circumferential direction on the outer periphery of the rod while being spaced apart from each other in the axial direction of the rod 262. Each of the recesses 272 communicates to a predetermined one of the flow paths 268 in the receiving member 260. The rod 262 further includes a plurality of flow paths, i.e., holes 274 extending along the axis 21 toward the front end surface of the rod 262. Each of the holes 274 communicates to a predetermined one of the recesses 272 in the rod 262 and opens to the front end surface of the rod 262.

As shown in FIGS. 16 and 19, the drive mechanism 250 and fluid guide mechanism 256 are shifted integrally in parallel to the axis 21 by a drive mechanism 276 disposed below the drive mechanism 250. The drive mechanism 276 in the illustrated embodiment is composed of a double-acting hydraulic jack disposed so as to expand or contract in parallel to the axis 21. A cylinder 278 of the jack is connected to the connecting member 228 by a connecting tool 280, and a piston rod 282 is connected to the fluid guide mechanism 256 by a connecting tool 284.

Figure 25:
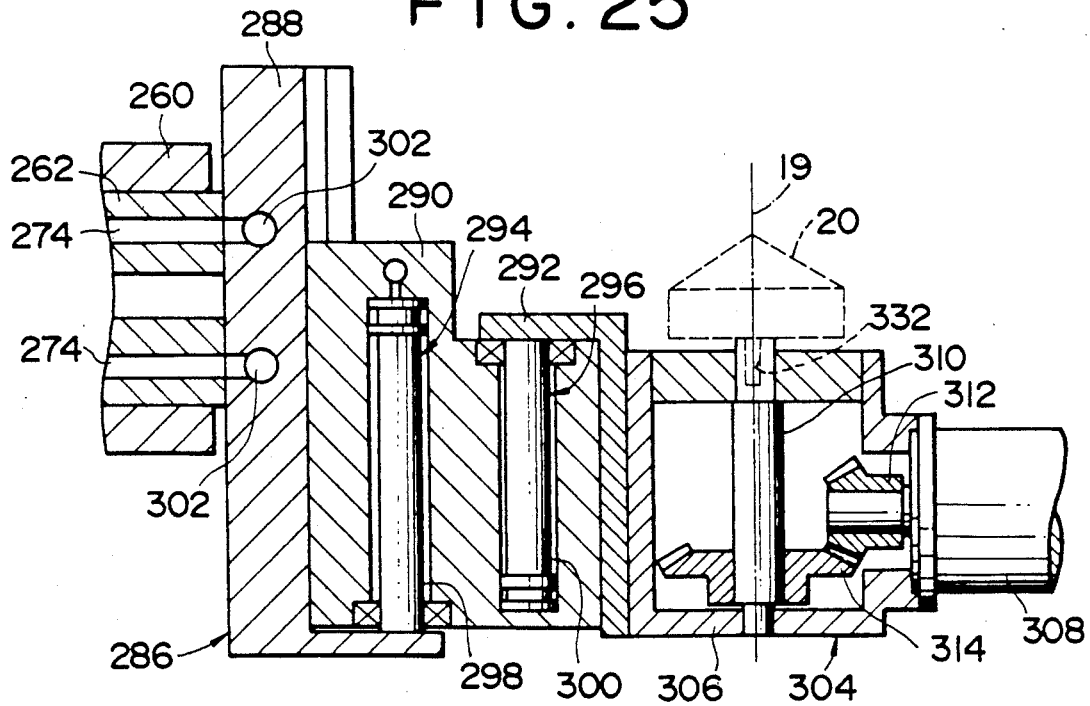
FIG. 25 is an enlarged-scale sectional view taken along the line 25—25 in FIG. 17.

On the front end of the rod 262 is mounted a drive mechanism 286 for shifting the cutter 20 in parallel to its own rotary axis 19. The drive mechanism 286, as shown in FIG. 25, is provided with a guide rail 288 attached fixedly to the front end of the rod 262 by means of a plurality of bolts, a first slider 290 supported on the guide rail 288 so as to be movable in parallel to the rotary axis 19 and a second slider 292 supported on the first slider 290 so as to be movable in parallel to the rotary axis 19.

The guide rail 288 and first slider 290 are brought into engagement with each other so as to be movable relative to each other in parallel to the axis 19 without separating from each other. Similarly, the first and second sliders 290,292 are brought into engagement with each other so as to be movable relative to each other in parallel to the axis 19 without separating from each other.

The first slider 290 is provided with double-acting hydraulic cylinder mechanisms 294,296 for shifting the cutter 20 in parallel to its own rotary axis 19. A piston rod 298 of the cylinder mechanism 294 projects downward from the first slider 290 and is attached fixedly to the lower portion of the guide rail 288 by means of a screw. A piston rod 300 of the cylinder mechanism 296 projects upward from the first slider 290 and is connected removably to the second slider 292 by means of a screw. Therefore, the cylinder mechanisms 294,296 are substantially interconnected in series.

The guide rail 288 is formed with two pairs of flow paths 302 for use of the operating fluid. Each of the flow paths 302 communicates to the predetermined one of the holes 274 in the rod 262. One of the pair of the flow paths 302 communicates in common to both cylinder chambers on the extension side of the cylinder mechanisms 294,296 while the other one communicates in common to both cylinder chambers on the contraction side of the cylinder mechanisms 294,296.

On the second slider 292 is mounted a drive mechanism 304 for rotating the cutter 20 about its own rotary axis 19 in front of the drive mechanism 286. As shown in FIGS. 16 and 17, the drive mechanism 304 is provided with a gear box 306 attached fixedly to the second slider 292 by means of a plurality of bolts and a hydraulic motor 308 attached fixedly to the front end of the gear box.

As shown in FIG. 25, the gear box 306 supports a rotary shaft 310 for supporting the cutter 20 so as to be rotatable about the axis of the rotary shaft 310. The rotation of the hydraulic motor 308 is transmitted to the rotary shaft 310 through gears 312,314 disposed in the gear box 306.

To the front end of the hydraulic motor 308 is fixedly attached a port bed 316 for use of the operating fluid. The port bed 316 is provided with a pair of ports 318 for use of the operating fluid. Each of the ports 318 communicates to the remaining flow paths 302 of the drive mechanism 286 through a hose (not shown) while it communicates to the hydraulic motor 308.

On the port bed 316 is mounted a plate member 320, on which is mounted a remote-controllable television camera 322 for taking a picture of portions to be worked. An output signal from the television camera 322 is supplied to a monitor installed on the ground.

Figure 21:
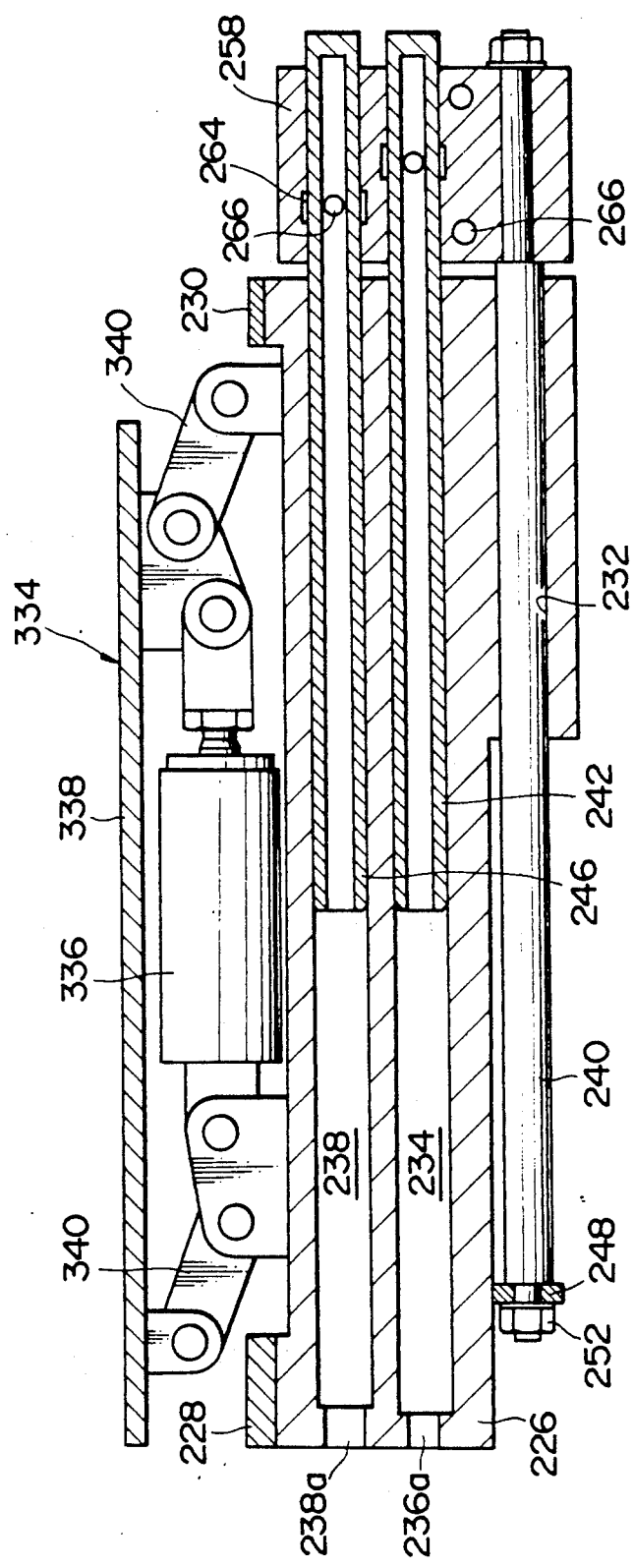
FIG. 21 is a sectional view taken along the line 21—21 in FIG. 20.
Figure 22:
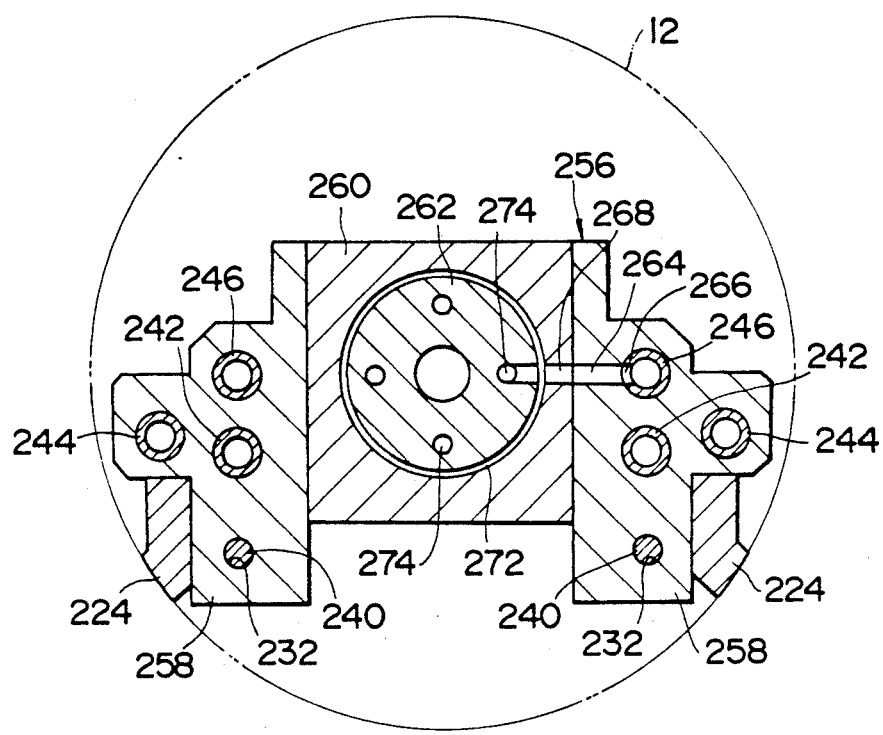
FIG. 22 is a sectional view taken along the line 22—22 in FIG. 16.

The apparatus 210 further comprises a position locking mechanism 334 for releasably locking the position of the support mechanism 222 relative to the first pipe 12. The position locking mechanism 334, as shown in FIGS. 18 and 21, is provided with a pair of double-acting hydraulic cylinder mechanisms 336 provided in correspondence to the first members 226 of the support mechanism 222. A cylinder of each of the hydraulic cylinder mechanisms 336 is pivotally connected to the corresponding one of the first members 226, while a piston rod of the hydraulic cylinder mechanism 336 is pivotally connected to the lower surface of a common pad plate 338 disposed so as to cover the upper portion of the support mechanism 222.

The pad plate 338 is bent to have approximately the same curved surface as the inner surface of the first pipe 12 and pivotally connected to one end of a plurality of links 340. The other ends of the links 340 are pivotally connected to the first member 226 so as to constitute a parallel link.

Each of the cylinder mechanisms 336 includes a pair of ports 342 each communicating to the operating fluid source through a hose (not shown) and are operated synchronously.

As shown in FIGS. 19 and 24, the apparatus 210 further comprises a stroke sensor 344 for generating an electric signal in accordance with the displacement of the cutter 20 in parallel to the axis 21, a rotary sensor 346 for generating an electric signal in accordance with the angular displacement of the cutter 20 around the axis 21 and an inclinometer 348 for generating an electric signal in accordance with a slant angle of the apparatus 210 with respect to the vertical line.

The stroke sensor 344, rotary sensor 346 and inclinometer 348 are known devices each provided with a body and an actuator. The body of the stroke sensor 344 is connected to the connecting member 228 while the actuator thereof is connected to the fluid guide mechanism 256. The body of the rotary sensor 346 is connected to the connecting member 228 while the actuator thereof is connected to the rotary axis of the drive mechanism 250. The body of the inclinometer 348 is mounted on the connecting member 228 such that the actuator of the inclinometer 348 extends along a vertical line. Output signals from the sensors 344,346 and inclinometer 348 are supplied to the monitor installed on the ground.

Prior to the cutting operation, the apparatus 210 is first disposed in the first pipe 12 from a vertical shaft connected to the first pipe 12 under the condition that the cylinder mechanism 336 of the position locking mechanism 334 is contracted. When the cylinder mechanism 336 is contracted, the pad plate 338 is lowered toward the support mechanism 222, as shown in FIG. 16, to thereby permit the apparatus 210 to move relative to the first pipe 12.

Next, the apparatus 210 is shifted to a position where the cutter 20 faces to the pipe opening of the second pipe 18 by means of a rope and a winch.

When the portion of the first pipe 12 corresponding to the pipe opening of the second pipe 18 can be monitored from the interior of the first pipe 12, the apparatus 210 is determined in position by using the television camera 322 such that the cutter 20 is disposed in the center of the pipe opening of the second pipe 18. For that end, the portion photographed by the television camera 322 is reproduced on the monitor on the basis of the output signal from the television camera 322 and the apparatus 210 is shifted or the drive mechanisms 250,276 are operated to move the cutter 20 as monitoring the reproduced image.

When the apparatus 210 is shifted to a predetermined position, the cylinder mechanism 336 of the position locking mechanism 334 is extended. By so doing, since the pad plate 338 is pressed against the inner surface of the newly installed pipe 16, the apparatus 210 is maintained in position to be unmovable relative to the first pipe 12.

When the pair of cylinder mechanisms 336 are used as in the case of the apparatus 210, the pad plate 338 is pressed against the inner surface of the newly installed pipe 16 more severely in comparison with a case when one cylinder mechanism is used. Consequently, the apparatus 210 is maintained stably with respect to the first pipe 12.

When the cutting operation is done, the cylinder mechanisms 294,296 of the drive mechanism 286 are extended as the motor 308 of the drive mechanism 304 is operated. Accordingly, since the cutter 20 is lifted along the rotary axis 19 thereof while being rotated about the rotary axis 19, a hole is bored in that portion of the first pipe 12 which previously closed the pipe opening of the second pipe 18.

Next, the drive mechanisms 250, 276 are operated at least once, preferably over and over while the motor 308 of the drive mechanism 304 is operated under the condition that the cylinder mechanisms 294, 296 are extended. Therefore, the drive mechanism 250 and fluid guide mechanism 256 are reciprocated at least once along the axis 21 while the rod 262 of the fluid guide mechanism 256 is reciprocated at least once about the axis 21, so that the cutter 20 is reciprocated at least once in parallel to the axis 21 and in the circumferential direction of the first pipe 12 respectively through the drive mechanisms 286,304. As a result, the hole as noted above is expanded.

At the time of the cutting operation, when the cutter 20 is shifted by the drive mechanisms 250,276 such that the angular displacement of the rotary axis 19 of the cutter 20 and displacement in the direction of the axis 21 come to proper values, the locus of motion of the cutter 20 results in a circle or an ellipse. Further, by adjusting the timing in which the angular displacement comes to the maximum value and the timing in which the displacement in the axial direction comes to the maximum value, it is possible to set the direction of the long axis of the ellipse at will. Further, by adjusting the angular displacement and displacement in the direction of the axis 21, the locus of motion of the cutter 20 results in a desired ellipse in shape and size. Therefore, a desired hole in shape and size may be bored in accordance with the apparatus 210.

During the cutting process, the portion to be cut may be monitored by the television camera 322 and the monitor. In this case, each of the drive mechanisms and cylinder mechanisms may be manually remote-controlled. More preferably, each of the drive mechanisms and cylinder mechanisms is remote-controlled by a computer. By so doing, the boring operation may be effected without requirement of any skill.

When the cutting operation is done, it is preferable that the displacement of the cutter 20 in the direction of the axis 21 and angular displacement of the cutter 20 about the axis 21 are gradually increased by repeatedly operating the drive mechanisms 250,276 while operating the drive mechanism 304. By so doing, the hole as noted above may be gradually expanded.

When the apparatus 210 is used as an apparatus for removing the protrusions such as substances deposited on the inner surface of the first pipe 12 and projections of the second pipe 18 extending into the first pipe 12, use may be made of a cutter 20a as shown in FIGS. 10 and 11 instead of the cutter 20.

When the operation of removing the protrusions is done, it is preferable that the drive mechanism 286 is operated while the drive mechanisms 250, 276 and 204 are operated. Thus, since the cutter 20 is shifted toward the inner surface of the first pipe 12 while being rotated about its own rotary axis 19, angularly rotated about the axis 21 and reciprocated in the direction of the axis 21, the protrusions may be securely removed so as to be cut away up to the proximity of the inner surface of the first pipe 12.

When the apparatus 210 is used as an apparatus for disposing a plug of cutoff in the front end of the second pipe 18, use is made of a fixture 100 as shown in FIG. 12, instead of the cutter 20. The operation of closing the front end of the second pipe 18 with the plug 108 of cutoff is performed by operating the drive mechanism 286 while operating the drive mechanism 304 after the apparatus 210 is disposed in a predetermined position such that the plug 108 of cutoff faces toward the front end of the second pipe 18.

Upon completion of the operation, the apparatus 210 is taken out of the first pipe 12 with the cylinder mechanisms 294,296 of the drive mechanism 286 and cylinder mechanism 336 of the position locking mechanism 334 in a contracted state.

In the apparatus 210, when the drive mechanism 276 is operated, the members 234, 236 and 238 of the support mechanism 222 are shifted in the direction of the axis 21 relative to the first member 226, so that the flow paths of the operating fluid for use in the drive mechanisms 250, 286 and 304 are contracted. Further, when the drive mechanism 250 is operated, the rod 262 of the fluid guide mechanism 256 is rotated relative to the receiving member 260. However, since the positional relation between the recess 272 of the rod 262 and the flow path 268 of the receiving member 260 in the direction of the axis 21 is fixed constant, the flow paths of the operating fluid for use in the drive mechanisms 286 and 304 are maintained.

Therefore, according to the apparatus 210, even if the drive mechanisms 286,304 are rotated or shifted relative to the drive mechanisms 250, 276, it is not necessary to directly connect the operating fluid source to the drive mechanisms 286, 304 through flexible hoses. As a result, the angular rotation of the cutter 20 about the axis 21 and the movement of the cutter 20 in the direction of the axis 21 may be performed smoothly. Further, even if the length of the whole apparatus in the axial direction of the pipe is set to be a smaller size, the maximum length of the flow path of the support means may be set to be a larger size.

The apparatus 10 or 210 may be suitable to the application, in addition to the boring operation, protrusion removing operation and disposing operation of the plug of cutoff, to the operation of forming a tapped hole in the inner wall of a pipe or operation of screwing a bolt into the tapped hole, for example, by attaching another jig or tools to the rotary axis 52 or 310 instead of the cutter 20 and fixture 100.

What is claimed is:

1. An apparatus for conducting operations in the interior of a pipe such as cutting off the pipe for boring a hole in the pipe, removing substances attached to the inner surface of the pipe or a protrusion of a branch pipe extending into the pipe, or disposing a plug into the pipe opening of the branch pipe, comprising:
    A) a tool having a rotary axis;
    B) support means disposed in the interior of said pipe so as to be movable in the axial direction of the pipe;
    C) fluid guide means for guiding operating fluid, said guide means including a rod extending in the axial direction of said pipe and a tubular receiving member defining a space to receive the rod, said receiving member being supported by said support means and further provided with a plurality of liquid paths for the operating fluid, said rod being received within said space of said receiving member to be movable in the axial direction thereof and rotatable about its own axis;
    D) first drive means for angularly rotating said rod about its own axis with respect to said receiving member and also for moving the rod in the axial direction thereof; and
    E) second drive means for supporting said tool and for rotating said tool about its own rotary axis, said second drive means being actuated by said operating fluid which passes through said fluid guide means and being connected to said rod, to be rotated and moved together with the rod by said first drive means; and
    wherein said rod has a plurality of recesses disposed in the outer periphery of the rod so as to extend in the peripheral direction and formed spaced apart from each other in the axial direction of said pipe, and has a plurality of holes extending in the axial direction of said pipe, the recesses being respectively communicated with the liquid paths, the holes being respectively communicated with the recesses.

2. An apparatus for conducting operations in the interior of a pipe as claimed in claim 1, further comprising third drive means for moving said tool in the direction intersecting the axis of said pipe, actuated by said operating fluid which passes through said fluid guide means, said third drive means being connected to said rod and supporting said second drive means.

3. An apparatus for conducting operations in the interior of a pipe such as cutting off the pipe for boring a hole in the pipe, removing substances attached to the inner surface of the pipe or a protrusion of a branch pipe extending into the pipe, or disposing a plug into the pipe opening of the branch pipe, comprising:
    A) a tool having a rotary axis;
    B) support means disposed in the interior of said pipe so as to be movable in the axial direction of said pipe, said support means defining a plurality of first liquid paths for operating fluid, said liquid paths being expandable and contractible in the axial direction of said pipe, wherein said support means is provided with a first member having spaces each extending in the axial direction of said pipe and tubular second members each received by each of said spaces of the first member movably in the direction of the spaces to define said first liquid paths in cooperation with said first member;
    C) fluid guide means for guiding operating fluid, said guide means connected to said second members of the support means so as to move together and supported by said support means so as to be movable in the axial direction of said pipe, said fluid guide means being provided with a rod extending in the axial direction of said pipe and a receiving member defining a space for receiving the rod rotatably about its own axis, said rod being received within said space of said receiving member, wherein said receiving member is provided with second fluid paths each for operating fluid communicated with each of said first liquid paths;
    D) first drive means for moving the fluid guide means in the axial direction of said pipe with respect to said support means;
    E) second drive means for angularly rotating said rod with respect to said receiving member; and
    F) third drive means for supporting said tool and for rotating said tool about its own rotary axis, said third drive means being actuated by said operating fluid which passes through said support means and said fluid guide means and being connected with said rod to be moved and rotated together with the fluid guide means and the rod by said first and second drive means;
    wherein said rod has a plurality of recesses disposed in the outer peripheral direction and formed spaced apart from each other in the axial direction of said pipe and has a plurality of holes extending in the axial direction of said pipe, said recesses being respectively communicated with the second liquid paths, said holes being respectively communicated with said recesses.

4. An apparatus for conducting operations in the interior of a pipe as claimed in claim 3, further comprising fourth drive means for shifting said tool in a direction intersecting the axis of said pipe, and fourth drive means supporting said third drive means and being supported by said rod.

5. An apparatus for conducting operations in the interior of a pipe as claimed in claim 3, wherein said second drive means is supported by said support means so as to be movable together with said fluid guide means.

6. An apparatus for conducting operations in the interior of a pipe as claimed in claim 3,
    wherein said first member has a hole extending through said first member in the axial direction of said pipe, and
    wherein said fluid guide means and said second drive means are supported by a shaft which is received in said hole of the first member so as to be movable in the axial direction of said pipe.

7. An apparatus for conducting operations in the interior of a pipe such as cutting off the pipe for boring a hole in the pipe, removing substances attached to the inner surface of the pipe or a protrusion (18*a*) of a branch pipe (18) extending into the pipe, or disposing a plug (108) into the pipe opening of the branch pipe (18), comprising;
    A. a tool (20, 20*a*, 100) having a rotary axis (19);

B. support means (22, 222) disposed in said pipe (12) so as to be movable in the axial direction of said pipe;

C. first drive means (50, 304) for rotating said tool about the rotary axis thereof, said first drive means having tool mounting portion (70, 332) for mounting said tool; and D. second drive means (40, 286) for displacing said tool in the radial direction of said pipe, said second drive means supporting the first drive means and disposed in said support means, wherein said second drive means (40, 286) is provided with a plurality of interconnected cylinder mechanisms (152, 154, 294, 296) adapted and arranged to displace the tool in the radial direction of said pipe by a value corresponding to a total amount of expansion and contraction of said cylinder mechanisms.

8. An apparatus for conducting operations in the interior of a pipe as claimed in claim 7, wherein said second drive means (40, 286) displaces said first drive means in the radial direction of said pipe (12) to displace said tool (20, 20a, 100).

9. An apparatus for conducting operations in the interior of a pipe as claimed in claim 7, further comprising a third drive means (32, 34, 250, 276) for displacing said tool so that said rotary axis (19) of said tool (20, 20a, 100) can be displaced in the axial direction of said pipe (12) and also angularly displaced about the axial direction of said pipe, said third drive means being supported by said support means (22, 222) and supporting said second drive means 40, 286).

10. An apparatus for conducting operations in the interior of a pipe as claimed in claim 9, wherein said third drive means (32, 34, 250, 276) displaces said second drive means (40, 286) in the axial direction (21) of said pipe (12) and also angularly displaces the second drive means about an axis extending int he axial direction of said pipe to displace said tool (20, 20a, 100).

11. An apparatus for conducting operations in the interior of a pipe as claimed in claim 7, further comprising;

third drive means (32, 250) for displacing said tool (20, 20a, 100) so that the rotary axis (19) of said tool can be angularly rotated about an axis extending in the axial direction of said pipe, said third drive means supporting said second drive means (40, 286); and fourth drive means (34, 276) for displacing said tool so that said rotary axis of said tool can be displaced in the axial direction of said pipe, said fourth drive means being supported by said support means (22, 222) and supporting said third drive means.

12. An apparatus for conducting operations in the interior of a pipe as claimed in claim 11, wherein said third drive means (32, 250) angularly rotates said second drive means (40, 286) about an axis extending in the axial direction of said pipe (12) to displace said tool (20, 20a, 100); and wherein said fourth drive means (34, 276) displaces said third drive means (32, 250) in the axial direction of said pipe (12) to displace said tool.

13. An apparatus for conducting operations in the interior of a pipe as claimed in claim 9, further comprising:

fluid guide means (110) for guiding operating fluid to actuate said first and second guide means (50, 304, 40, 286), said fluid guide means being provided with a tubular receiving member (112) receiving a rod (116) extending in the axial direction of said pipe (12) and defining a space to receive said rod, said fluid guide means also being supported by said support means (22) so that said rod can be moved in the axial direction of said pipe;

wherein said receiving member (112) is provided with a plurality of liquid paths (118, 120, 122, 124) for said operating fluid;

wherein said rod (116) has a plurality of holes (138, 140, 142, 144) and a plurality of recesses (130, 132, 134, 136), each of the recesses being disposed in the outer periphery of the rod to extend along the periphery, the recesses being spaced apart from each other in the axial direction of said pipe and communicated respectively with the liquid paths, the holes (138, 140, 142, 144) being respectively communicated with the recesses and extending in the axial direction of said pipe;

wherein said second drive means (40) is supported by said third drive means (32, 34) through said rod; and wherein said third drive means (32, 34) displaces said tool by moving said rod in the axial direction of said pipe and by rotating said rod about its own axis.

14. An apparatus for conducting operations in the interior of a pipe as claimed in claim 11, further comprising:

fluid guide means (256) for guiding operating fluid to actuate said first and second drive means (304, 286), the fluid means being supported by said support means (222) so as to be movable in the axial direction of said pipe and including a receiving member (260) for receiving a rod (262) extending in the axial direction of said pipe (12) and defining a space to receive the rod rotatably about its own axis;

wherein said support means (222) is provided with a first member (226) having spaces (236, 238, 240) extending in the axial direction of said pipe; and second members (242, 244, 246) extending in the axial direction of said pipe; and second members (242, 244, 246) being respectively received along the axial direction of said spaces of the first member so that each of the second members may define a first liquid path for operating fluids, each of said first liquid paths being exapndable and contractible in the axial direction of said pipe in cooperation with said first member;

wherein said receiving member (260) is provided with second liquid paths (264, 266, 268) respectively for said operating fluids so as to communicate respectively with said first liquid paths of said support means;

wherein said rod (262) has holes (274) and recesses (272), the recesses being respectively communicated with said second liquid paths and disposed in the outer periphery of said rod to extend along the periphery of the rod and spaced spaced apart from each other in the axial direction of said pipe; the holes (274) being respectively communicated with recess (272) and extending in the axial direction of said pipe (12);

-wherein said second drive means (286) is supported by said third drive means (250) through said rod;

wherein said third drive means (250) displaces said tool (20, 20a, 100) by angularly rotating said rod with respect to said receiving member; and wherein said fourth drive means (276) displaces said fluid guide means in the axial direction of said pipe to displace said tool (20, 20a, 100).

15. An apparatus for conducting operations in the interior of a pipe such as cutting off the pipe for boring a hole in the pipe, removing substances attached to the inner surface of the pipe or a protrusion (18a) of a branch pipe (18) extending into the pipe, or disposing a plug (108) into the pipe opening of the branch pipe (18) comprising;
  A) a tool (20, 20a, 100) having a rotary axis (19);
  B) support means (22, 222) disposed in said pipe (12) so as to be movable in the axial direction (21) of said pipe;
  C) first drive means (50, 304) for rotating said tool about its own rotary axis (19), said first drive means having a tool mounting portion (70, 332) for mounting said tool;
  D) second drive means (40, 286) for displacing said tool in the radial direction of said pipe and for supporting the first drive means, said second drive means (40, 286) being provided with a pluarality of interconnected cylinder mechanisms (152, 154, 294, 296) adapted and arranged to displace the tool in the radial direction of said pipe by a value corresponding to a total amount of the expansion and contraction of said cylinder mechanisms; and
  (E) third drive means (32, 34, 250, 276) for displacing said tool so that the rotary axis of said tool can be displaced in the axial direction of said pipe and angularly displaced about an axis extending in the axial direction of said pipe, said third drive means supporting by said support means and supporting said second drive means.

16. An apparatus for conducting operations in the interior of a pipe such as cutting off the pipe for boring a hole in a pipe, removing substances attached to the inner surface of the pipe or a protrusion (18a) of a branch pipe (18) extending into the pipe, disposing a plug (108) into the pipe opening of the branch pipe (18) comprising;
  A. a tool (20, 20a, 100) having a rotary axis (19);
  B. support means (22, 222) disposed in said pipe (12) so as to be movable in the axial direction (21) of said pipe;
  C. first drive means (50, 304) for rotating said tool about its own rotary axis (19), said first drive means having a tool mounting portion (70, 332) for mounting said tool;
  D. second drive means (40, 286) for displacing said tool in the radial direction of said pipe and for supporting the first drive means, said second drive means (40, 286) being provided with a plurality of interconnected cylinder mechanisms (152, 154, 294, 296) adapted and arranged to displace the tool in the radial direction of said pipe by a value corresponding to a total amount of the expansion and contraction of said cylinder mechanisms;
  (E. third drive means (32, 34, 250, 276) for displacing said tool so that the rotary axis of said tool can be displaced in the axial direction of said pipe and angularly displaced about an axis extending in the axial direction of said pipe, said third drive means supporting by said support means and supporting said second drive means; and
  F. fourth drive means (34, 276) for displacing said tool so that said rotary axis of said tool can be displaced in the axial direction of said pipe, said fourth drive means being supported by said support means and supporting said third drive means.

* * * * *

UNITED STATES PATENT AND TRADEMARK OFFICE
CERTIFICATE OF CORRECTION

PATENT NO. : 5,046,903
DATED : September 10, 1991
INVENTOR(S) : Nagayoshi et al

It is certified that error appears in the above-indentified patent and that said Letters Patent is hereby corrected as shown below:

```
Column 18, line 6 (Claim 13, line 20), after "guiding", please
insert --said--.
Column 18, line 7 (Claim 3, line 21), before "guide", please
insert --fluid--.
Column 19, line 38 (Claim 10, line 6), "int he" should be --in the--.
Column 20, line 32 (Claim 14, line 6), after "fluid", please insert
--guide--.
Column 21, line 28 (Claim 15, line 25), "(E)" should be --E)--.
Column 22, line 9 (Claim 16, line 11), "said" should be --the--.
Column 22, line 24 (Claim 16, line 25), "(E" should be --E.--.
```

Signed and Sealed this

First Day of April, 1997

Attest:

BRUCE LEHMAN

Attesting Officer

Commissioner of Patents and Trademarks